US008536277B2

(12) United States Patent
Mueller et al.

(10) Patent No.: US 8,536,277 B2
(45) Date of Patent: Sep. 17, 2013

(54) CATALYST SYSTEMS AND THEIR USE FOR METATHESIS REACTIONS

(75) Inventors: Julia Marie Mueller, Blaustein (DE); Oskar Nuyken, Munich (DE); Werner Obrecht, Moers (DE)

(73) Assignee: LANXESS Deutschland GmbH, Leverkusen (DE)

(*) Notice: Subject to any disclaimer, the term of this patent is extended or adjusted under 35 U.S.C. 154(b) by 1006 days.

(21) Appl. No.: 12/489,851

(22) Filed: Jun. 23, 2009

(65) Prior Publication Data

US 2010/0087600 A1   Apr. 8, 2010

(30) Foreign Application Priority Data

Jul. 8, 2008  (EP) .................................... 08159917

(51) Int. Cl.
  *C08L 33/18*   (2006.01)
  *C08L 9/00*    (2006.01)
  *C08F 4/00*    (2006.01)
  *C08F 20/44*   (2006.01)

(52) U.S. Cl.
  USPC ........... 525/251; 525/230; 525/233; 525/238; 525/245; 525/329.1; 502/203

(58) Field of Classification Search
  USPC ................................ 525/251, 337, 329.1, 238
  See application file for complete search history.

(56) References Cited

U.S. PATENT DOCUMENTS

| | | | |
|---|---|---|---|
| 3,700,637 A | 10/1972 | Finch, Jr. ...................... | 260/83.3 |
| 4,464,515 A | 8/1984 | Rempel et al. ................ | 525/338 |
| 4,503,196 A | 3/1985 | Rempel et al. ................ | 525/338 |
| 4,581,417 A | 4/1986 | Buding et al. ................ | 525/338 |
| 4,631,315 A | 12/1986 | Buding et al. ................ | 525/338 |
| 4,746,707 A | 5/1988 | Fiedler et al. ................ | 525/338 |
| 4,812,528 A | 3/1989 | Rempel et al. ................ | 525/338 |
| 4,978,771 A | 12/1990 | Fiedler et al. ................ | 558/459 |
| 5,728,917 A | 3/1998 | Grubbs et al. ................ | 585/653 |
| 6,673,881 B2 | 1/2004 | Guerin ......................... | 526/160 |
| 6,683,136 B2 | 1/2004 | Guo et al. .................... | 525/329.3 |
| 6,759,537 B2 | 7/2004 | Grubbs et al. ................ | 548/101 |
| 6,841,623 B2 * | 1/2005 | Guerin et al. ................ | 525/230 |
| 6,867,303 B2 | 3/2005 | Grela ........................... | 548/101 |
| 7,205,424 B2 | 4/2007 | Nolan ........................... | 556/136 |
| 7,329,758 B1 | 2/2008 | Grubbs et al. ................ | 548/103 |
| 2001/0039360 A1 | 11/2001 | Grubbs et al. ................ | 556/136 |
| 2002/0107138 A1 | 8/2002 | Hoveyda et al. ............. | 502/152 |
| 2003/0236427 A1 | 12/2003 | Grubbs ........................ | 558/238 |
| 2004/0095792 A1 * | 5/2004 | Herrmann et al. ............ | 365/21 |
| 2004/0127647 A1 | 7/2004 | Ong et al. .................... | 525/191 |
| 2004/0132891 A1 | 7/2004 | Ong et al. .................... | 524/492 |
| 2007/0208206 A1 | 9/2007 | Obrecht et al. ............... | 585/645 |
| 2008/0076881 A1 | 3/2008 | Obrecht et al. ............... | 525/339 |
| 2009/0076226 A1 | 3/2009 | Meca et al. ................... | 525/340 |

FOREIGN PATENT DOCUMENTS

| | | |
|---|---|---|
| DE | 35 41 689 | 5/1987 |
| EP | 25 39 132 | 3/1977 |
| EP | 0 419 952 | 4/1991 |
| EP | 0 471 250 | 2/1992 |

OTHER PUBLICATIONS

Fustero et al. Microwave-Assisted Tandem Cross Metathesis Intramolecular Aza-Michael Reaction: An Easy Entry to Cyclic β-Amino Carbonyl Derivatives. Journal of American Chemical Society. 2007. 129. pp. 6700-6701.*
Furstner et al. Cationic ruthenium allenylidene complexes catalysts for ring closing olefin metathesis. Chemistry—A European Joournal. 2000. 6. No. 10. p. 1852.*
Kelsey et al. In situ catalyst systems for ring-opening metathesis polymerization. Journal or Polymer Science, Part A: Polymer Chemistry. 35(14), p. 3029.*
Ledoux et al. In situ generation of highly active olefin metathesis initiators. Journal of Organometallic Chemistry. 691. 2006. pp. 5482-5484.*
J. Am. Chem. Soc., 1997, 119, pg. 3887-3897, "Well-Defined Ruthenium Olefin Metathesis Catalysts: Mechanism and Activity"; Eric L. Dias, SonBinh T. Nguyen, and Robert H. Grubbs.
Inorganica Chimica Acta, 359, (2006), pp. 2910-2917; Meyer et al.; "Tin and iron halogenides as Additives in ruthenium-catalyzed olefin metathesis".
ChemBioChem 2003, 4, pp. 1229-1231; Roberts et al; "Comparison of Fertilinβ-Peptide-Substitued Polymers and Liposomes as Inhibitors of In Vitro Fertilization", XP-002433024
J. Org. Chem. 2003, 68, pp. 2020-2023; Roberts and Sampson; "Increased Polymer Length of Oligopeptide-Substituted Polynorbornenes with LiCl" XP-002433025.
J. Org. Chem. Soc. 1997, 119, pp. 9130-9136; Fürstner and Langemann; "Total Synthesis of (+)-Ricinelaidic Acid Lactone and of (−)-Gloeosporone Based on Transition-Metal-Catalyzed C-C Bond Formations".
Organic Biomol. Chem., 2005, 3, pp. 4139-4142; Chen-Xi Bai et al.;"Lewis-acid assisted cross Metathesis of acrylonitrile with functionalixed olefins catalyzed by phosphine-free ruthenium carbine complex".
Synlett, 2005, No. 4, pp. 670-672; Vedrenne et al; "Dramatic Effect of Boron-Based Lewis Acids In Cross-Metathesis Reactions".
Synthesis 2000, No. 12, pp. 1766-1773; Bentz and Laschat; "Synthesis of Perhydroindenes and Perhydroisoindoles via One-Pot Enyne Metathesis/Diels-Alder Reaction; Remarkable Stability of Grubbs Catalyst under Lewis Acidic Conditions".
Angew. Chem. Int., Ed. 2003, 42, pp. 4592-4633; Schrock and Hoveyda; "Molybdenum and Tungsten Imido Alkylidene Complexes as Efficient Olefin-Metathesis Catalysts".
Angew. Chem. Int. Ed., 2002, 41, No. 21, pp. 4038-4040; Grela et al; "A Highly Efficient Ruthenium Catalyst for Metathesis Reactions".
Angew. Chem. Int. Ed., 2004, 43, pp. 6161-6165; "Rapidly Initiating Ruthenium Olefin—Metathesis Catalysts".

(Continued)

*Primary Examiner* — David W Wu
*Assistant Examiner* — Elizabeth Eng
(74) *Attorney, Agent, or Firm* — Jennifer R. Seng

(57) ABSTRACT

A novel process for reducing the molecular weight of nitrile rubber in the presence of specific catalyst systems containing the metathesis catalyst and also a specific addition of fluorine-containing boron compounds is provided.

32 Claims, No Drawings

(56) References Cited

OTHER PUBLICATIONS

Organometallics 2001, 20, pp. 5314-5318; Sanford, Love, and Grubbs; "A Versatile Precursor for the Synthesis of New Ruthenium Olefin Metathesis Catalysts".

Chem. Eur. J., 2004, 10, pp. 777-784; "Synthesis and Rectivity of Homogeneous and Hetero-geneous Ruthenium—Based Metathesis Catalysts Containing Electron-Withdrawing Ligands".

J. Org. Chem. 2004, 69, pp. 6894-6896; Robert Bujok et al; pp. 6894-6896; Ortho- and Para-Substituted Hoveya-Grubbs Carbenes. An Improved Synthesis of Highly Efficient Metathesis Initiators.

Eur. J. Org. Chem, 2003, pp. 963-966; Karol Grela and Mikhail Kim; "A Good Bargain: An Inexpensive, Air-Stable Ruthenium Metathesis Catalyst Derived from α-Asarone".

Journal of the American Chemical Society; Fustero, Santos et al.; 2007; 129(21) pp. 6700-6701; "Microwave-Assisted Tandem Cross Metathesis Intramolecular Aza-Michael Reaction: An Easy Entry to Cyclic β-Amino Carbonyl Deratives".

Chemistry—A European Journal; Furstner, Alois et al; (2000) 6, No. 10; pp. 1847-1857; "Cationic Ruthenium Allenylidene Complexes as Catalysts for Ring Closing Olefin Metathesis" XP-002494975.

Journal of Polymer Science, Part A: Polymer Chemistry, 35(14), pp. 3027-3047; Kelsey, Donald R. et al; "In Situ Catalyst Systems for Ring Opening Metathesis Polymerization" XP-002494976, 1997.

Journal of Organometallic Chemistry, 691 (2006) pp. 5482-5846; Ledoux et al; "In situ generation of highly active olefin metathesis initiators" XP-005779993.

European Search Report in co-pending Application No. EP 08 15 9917, Sep. 10, 2008.

European Search Report from co-pending Application EP 09 16 4639, Sep. 21, 2009.

\* cited by examiner

CATALYST SYSTEMS AND THEIR USE FOR METATHESIS REACTIONS

FIELD OF THE INVENTION

The present invention relates to catalyst systems, their use for the catalysis of metathesis reactions and in particular a process for reducing the molecular weight of nitrile rubber by metathesis using these catalysts systems.

BACKGROUND OF THE INVENTION

Metathesis reactions are used widely in chemical syntheses, e.g. in ring-closing metathesis (RCM), cross-metathesis (CM), ring-opening metathesis (ROM), ring-opening metathesis polymerizations (ROMP), cyclic diene metathesis polymerizations (ADMET), self-metathesis, reaction of alkenes with alkynes (enyne reactions), polymerization of alkynes and olefinization of carbonyls (WO-A-97/06185 and Platinum Metals Rev., 2005, 49(3), 123-137). Metathesis reactions are employed, for example, for the synthesis of olefins, for the ring-opening polymerization of norbornene derivatives, for the depolymerization of unsaturated polymers and for the synthesis of telechelic polymers.

Metathesis catalysts are known, inter alia, from WO-A-96/04289 and WO-A-97/06185. They have the following basic structure:

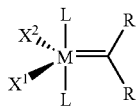

where M is osmium or ruthenium, the radicals R are identical or different organic radicals having a wide range of structures, $X^1$ and $X^2$ are anionic ligands and L is in each case an uncharged electron donor. The customary term "anionic ligands" is always used in the literature concerning such metathesis catalysts to describe ligands which, when viewed as removed from the metal centre, are negatively charged when they have a closed electron shell.

Metathesis reactions have recently also become increasingly important for the degradation of nitrile rubbers.

The term nitrile rubber, also referred to as "NBR" for short, refers to rubbers which are copolymers or terpolymeres of at least one α,β-unsaturated nitrile, at least one conjugated diene and, if appropriate, one or more further copolymerizable monomers.

Hydrated nitrile rubber, also referred to as "HNBR" for short, is produced by hydration of nitrile rubber. Accordingly, the C=C double bonds of the copolymerized diene units are completely or partly hydrated in HNBR. The degree of hydration of the copolymerized diene units is usually in the range from 50 to 100%. Hydrated nitrile rubber is a speciality rubber which has very good heat resistance, excellent resistance to ozone and chemicals and also an excellent oil resistance.

The abovementioned physical and chemical properties of HNBR are combined with very good mechanical properties, in particular a high abrasion resistance. For this reason, HNBR has found wide use in a wide variety of applications. HNBR is used, for example, for seals, hoses, belts and damping elements in the automobile sector, also for stators, well seals and valve seals in the field of oil production and also for numerous parts in the aircraft industry, the electrical industry, machine construction and shipbuilding.

Most commercially available HNBR grades usually have a Mooney viscosity (ML 1+4 at 100° C.) in the range from 55 to 120, which corresponds to a number average molecular weight $M_n$ (determination method: gel permeation chromatography (GPC) against polystyrene standards) in the range from about 200 000 to 700 000. The polydispersity indices PDI (PDI=$M_w/M_n$, where $M_w$ is the weight average molecular weight and $M_n$ is the number average molecular weight), which indicate the width of the molecular weight distribution, measured here frequently have a value of 3 or above. The residual double bond content is usually in the range from 0 to 18% (determined by NMR or IR spectroscopy). However, the term "fully hydrated grades" is used in the technical field when the residual double bond content is not more than about 0.9%.

The processability of HNBR grades having the abovementioned relatively high Mooney viscosities is subject to limitations. For many applications, it is desirable to have HNBR grades which have a lower molecular weight and thus a lower Mooney viscosity, since this significantly improves the processability.

Many attempts have been made in the past to shorten the chain length of HNBR by degradation. For example, it is possible to reduce the molecular weight by thermomechanical treatment (mastication), e.g. on a roll mill or also in a screw apparatus (EP A-0 419 952). However, this thermomechanical degradation has the disadvantage that functional groups such as hydroxyl, keto, carboxylic acid and ester groups are built into the molecule as a result of partial oxidation and, in addition, the microstructure of the polymer is substantially altered.

The preparation of HNBR having low molar masses, corresponding to a Mooney viscosity (ML 1+4 at 100° C.) in the range below 55 or a number average molecular weight $M_n$ of <200 000 g/mol, has for a long time not been possible by means of established production processes since, firstly, a step increase in the Mooney viscosity occurs in the hydration of NBR and, secondly, the molar mass of the NBR feedstock used for the hydration cannot be reduced at will since otherwise processing in the available industrial plants is no longer possible because of excessive high stickiness. The lowest Mooney viscosity of an NBR feedstock which can be processed without difficulties in an established industrial plant is about 30 Mooney units (ML 1+4 at 100° C.). The Mooney viscosity of the hydrated nitrile rubber obtained from such an NBR feedstock is in the order of 55 Mooney units (ML 1+4 at 100° C.). The Mooney viscosity is determined in accordance with ASTM Standard D 1646.

In the more recent prior art, this problem is solved by reducing the molecular weight of the nitrile rubber by degradation to a Mooney viscosity (ML 1+4 at 100° C.) of less than 30 Mooney units or a number average molecular weight $M_n$ of <70 000 g/mol before hydration. The decrease in the molecular weight is achieved by metathesis in which low molecular weight 1-olefins are usually added. The metathesis of nitrile rubber is described, for example, in WO-A-02/100905, WO-A-02/100941 and WO-A-03/002613. The metathesis reaction is advantageously carried out in the same solvent as the hydration reaction so that the degraded nitrile rubber does not have to be isolated from the solvent after the degradation reaction is complete before it is subjected to the subsequent hydration. The metathesis degradation reaction is catalysed using metathesis catalysts which are tolerant to polar groups, in particular nitrile groups.

WO-A-02/100905 and WO-A-02/100941 describe a process which comprises the degradation of nitrile rubber starting polymers by olefin metathesis and subsequent hydration to give HNBR having a low Mooney viscosity. Here, a nitrile rubber is reacted in a first step in the presence of a coolefin and specific complex catalysts based on osmium, ruthenium, molybdenum or tungsten and hydrated in a second step. In this way, it is possible to obtain hydrated nitrile rubbers having a weight average molecular weight ($M_w$) in the range from 30 000 to 250 000, a Mooney viscosity (ML 1+4 at 100° C.) in the range from 3 to 50 and a polydispersity index PDI of less than 2.5.

For the metathesis of nitrile rubber, it is possible to use, for example, the catalyst bis(tricyclohexylphosphine)benzylidene ruthenium dichloride shown below.

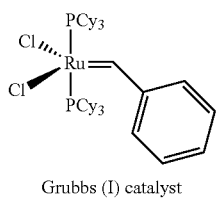

Grubbs (I) catalyst

After metathesis and hydration, the nitrile rubbers have a lower molecular weight and a narrower molecular weight distribution than the hydrated nitrile rubbers which could hitherto be prepared according to the prior art.

However, the amounts of Grubb (I) catalyst employed for carrying out the metathesis are large. In the experiments in WO-A-03/002613, they are, for example, 307 ppm and 61 ppm of Ru based on the nitrile rubber used. The reaction times necessary are also long and the molecular weights after degradation are always still relatively high (see Example 3 of WO-A-03/002613, in which $M_w$=180 000 g/mol and $M_n$=71 000 g/mol).

US 2004/0127647 A1 describes blends based on low molecular weight HNBR rubbers having a bimodal or multimodal molecular weight distribution and vulcanizates of these rubbers. According to the examples, the metathesis is carried out using 0.5 phr of Grubbs I catalyst. This corresponds to an amount of 614 ppm of ruthenium based on the nitrile rubber used.

Furthermore, WO-A-00/71554 discloses a group of catalysts which are referred to in the art as "Grubbs (II) catalysts".

If such a "Grubbs (II) catalyst", e.g. the catalyst 1,3-bis(2,4,6-trimethylphenyl)-2-imidazolidenylidene)(tricyclohexylphosphine)(phenylmethylene)ruthenium dichloride shown below, is used for the NBR metathesis (US-A-2004/0132891), this can be carried out successfully without use of a coolefin.

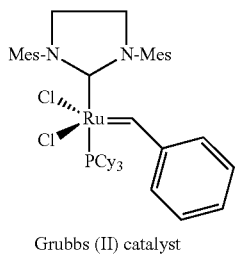

Grubbs (II) catalyst

After the subsequent hydration, which is preferably carried out in the same solvent, the hydrated nitrile rubber has lower molecular weights and a narrower molecular weight distribution (PDI) than when catalysts of the Grubbs (I) type are used. The metathetic degradation using catalysts of the Grubbs (II) type thus proceeds more efficiently in respect of the molecular weight and the molecular weight distribution than when using catalysts of the Grubbs (I) type. However, the amounts of ruthenium necessary for this efficient metathetic degradation are still relatively high. In addition, long reaction times are still required for carrying out the metathesis using the Grubbs (II) catalyst.

In all the abovementioned processes for the metathetic degradation of nitrile rubber, relatively large amounts of catalyst have to be used and long reaction times are required in order to prepare the desired low molecular weight nitrile rubbers by means of metathesis.

In the other types of metathesis reactions, too, the activity of the catalysts used is of critical importance.

In J. Am. Chem. Soc. 1997, 119, 3887-3897, it is stated that in the ring-closing metathesis of diethyl diallylmalonate shown below,

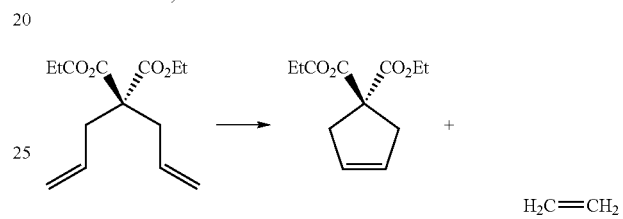

the activity of the catalysts of the Grubbs (I) type can be increased by additions of CuCl and $CuCl_2$. This activity increase is explained by a shift in the dissociation equilibrium as a result of which a phosphane ligand which has been released reacts with copper ions to form copper-phosphane complexes.

However, this activity increase brought about by copper salts in the ring-closing metathesis mentioned cannot be applied at will to other types of metathesis reactions. Our own studies have shown that although the addition of copper salts leads to an initial acceleration of the metathetic degradation of nitrile rubbers, a significant worsening of the efficiency of the metathesis is then unexpectedly observed: the molecular weights of the degraded nitrile rubbers which are ultimately achieved are substantially higher than when the metathesis reaction is carried out in the presence of the same catalyst but in the absence of the copper salts.

EP-A-1 825 913 describes new catalyst systems for metathesis, in which not only the actual metathesis catalyst but also one or more salts are used. This combination of one or more salts with the metathesis catalyst leads to an increase in the activity of the catalyst, a synergistic effect. The anions and cations of these salts can have a large number of meanings which can be selected from various lists. In the examples of EP-A-1 825 913, the use of lithium bromide is found to be particularly advantageous both for the metathetic degradation of rubbers such as nitrile rubbers and also for the ring-closing metathesis of diethyl diallylmalonate. Catalysts mentioned are, in particular, ones which coordinate via an oxygen-, nitrogen- or sulphur-containing substituent to the metal centre of a ruthenium- or osmium-carbene. Use is made of, for example, the Grubbs (H) catalyst, the Hoveyda catalyst, the Buchmeiser-Nuyken catalyst and the Grela catalyst.

An as yet unpublished German patent application describes specific catalyst systems for metathesis, which comprise not only the actual metathesis catalyst but also alkaline earth metal chlorides, preferably magnesium or calcium chloride, as added salts.

EP-A-1 894 946 describes an increase in activity of metathesis catalysts as a result of specific phosphane additions.

The increase in activity of metathesis catalysts brought about by salts has likewise been studied in Inorganica Chimica Acta 359 (2006) 2910-2917. The influences of tin chloride, tin bromide, tin iodide, iron(II) chloride, iron(II) bromide, iron(III) chloride, cerium(III) chloride*$7H_2O$, ytterbium(III) chloride, antimony trichloride, gallium dichloride and aluminium trichloride on the self-metathesis of 1-octene to form 7-tetradecene and ethylene were examined. When using the Grubbs (I) catalyst, a significant improvement in the conversion to 7-tetradecene was observed when tin chloride or tin bromide was added (Table 1; catalyst 1). Without addition of salt, a conversion of 25.8% was achieved; when 5 $nCl_2*2H_2O$ was added, the conversion rose to 68.5% and when tin bromide was added it rose to 71.9%. Addition of tin iodide resulted in a significant decrease in the conversion from 25.8% to 4.1%. In combination with the Grubbs (II) catalyst (Table 1; catalyst 2), on the other hand, all three tin salts led to only slight improvements in yield from 76.3% (reference experiment without addition) to 78.1% ($SnCl_2$), to 79.5% ($SnBr_2$) and 77.6% ($SnI_2$). When "phobcat" [Ru(phobCy)$_2$Cl$_2$(=CHPh)] is used (Table 1; catalyst 3), the conversion is decreased from 87.9% to 80.8% by addition of $SnCl_2$, to 81.6% by $SnBr_2$ and to 73.9% by $SnI_2$. When iron(II) salts are used in combination with the Grubbs (I) catalyst (Table 3; catalyst 1), the increase in conversion when using iron(II) bromide is higher than when using iron(II) chloride. It may be remarked that, regardless of the type of catalyst used, the conversion when bromides are used is always higher than when the corresponding chlorides are used.

However, the use of tin or iron(II) bromide described in Inorganica Chimica Acta 359 (2006) 2910-2917 is not an optimal solution for the preparation of nitrile rubbers because of the corrosive nature of the bromides.

In the preparation of hydrated nitrile rubbers, the solvent is usually removed by steam distillation after the hydration. If tin salts are used as part of the catalyst system, amounts of these tin salts get into the wastewater which therefore has to be subjected to costly purification. For this reason, the use of tin salts for increasing the activity of catalysts in the preparation of nitrile rubbers is not advisable from an economic point of view.

The use of iron salts is restricted by the fact that they reduce the capacity of some ion-exchange resins which are usually employed for recovering the noble metal compounds used in the hydration. This likewise adversely affects the economics of the overall process.

ChemBioChem 2003, 4, 1229-1231 describes the synthesis of polymers by a ring-opening metathesis polymerization (ROMP) of norbornyl oligopeptides in the presence of a ruthenium-carbene complex $Cl_2(PCy_3)_2Ru$=CHphenyl, with lithium chloride being added. The addition of lithium chloride is carried out with the declared objective of avoiding aggregation and increasing the solubility of the growing polymer chains. Nothing is said about an activity-increasing effect of the addition of the salt on the catalyst.

A method of carrying out a ring-opening polymerization of oligopeptide-substituted norbornenes is also known from J. Org. Chem. 2003, 68, 2020-2023, in which lithium chloride is used. Here too, the influence of lithium chloride as solubility-increasing additive for the peptides in nonpolar organic solvents is emphasized. For this reason, an increase in the degree of polymerization "DP" can be achieved by the addition of lithium chloride.

In J. Am. Chem. Soc. 1997, 119, 3887-3897 it is stated that when LiBr or NaI is added to a metathesis catalyst containing NHC ligands, e.g. the Grubbs (II) catalyst, the chloride ligands are replaced by bromide or iodide. Furthermore, it is shown that the catalyst activity depends on the type of halide ligands and increases in the following order: I<Br<Cl.

In J. Am. Chem. Soc. 1997, 119, 9130-9136 it is stated that the activity of the Grubbs (I) catalyst in the ring-closing metathesis of 1,ω-dienes can be increased by addition of tetraisopropoxytitanate and an improvement in yield can be achieved thereby. In the cyclization of the 9-decenoic ester of 4-pentenoate, a higher yield of the macrolide is achieved when tetraisopropanoxytitanate is added than when LiBr is added. There is no indication of the extent to which this effect can also be applied to other types of metathesis reactions or other metathesis catalysts.

In Org. Biomol. Chem. 2005, 3, 4139-4142 the cross-metathesis (CM) of acrylonitrile with itself and with other functional olefins when using [1,3-bis(2,6-dimethylphenyl)-4,5-dihydroimidazol-2-ylidene]($C_5H_5N$)$_2$(Cl)$_2$Ru=CHPh is examined. The yield of the respective product is improved by addition of tetraisopropoxytitanate. This publication gives the impression that the activity-increasing effect of tetraisopropoxytitanate occurs only when using a specific catalyst having pyridine ligands. There is no suggestion of an influence of tetraisopropoxytitanate when pyridine-free catalysts are used or in other types of metathesis reactions.

It is known from Synlett 2005, No. 4, 670-672 that the addition of tetraisopropoxytitanate in the cross-metathesis of allyl carbamate with methyl acrylate has an adverse effect on the product yield when the Hoveyda catalyst is used as catalyst. Thus, the product yield is reduced from 28% to 0% by addition of tetraisopropoxytitanate. Addition of dimethylaluminium chloride, too, reduces the yield from 28% to 20%.

In Synlett 2005, No. 4, 670-672 it is also stated that the product yield in the cross-metathesis of low molecular weight olefins is improved when specific boric acid derivatives are used. Use is made of chlorochatecholborane ($ArO_2BCl$), dichlorophenylborane ($PhBCl_2$) and chlorodicyclohexylborane ($Cy_2BCl$). Depending on the boric acid derivative, the yield is improved to very different extents. To obtain appropriate improvements in yield, addition of 10-20 mol % of the boric acid derivative based on 1 equivalent of an olefin is required.

In Synthesis 2000, No. 12, 1766-1773 it is stated that the yields in the ring-closing metathesis of diethyl diallylmalonate when using the Grubbs I catalyst are not adversely affected by additions of boron trichloride and aluminium trichloride (Table 2). In a tandem enyne methathesis/Diels-Alder reaction of N-allyl-N-3-phenylprop-2-ynyl-p-toluenesulphenamide to form 4-acyl-7-phenyl-hexahydroisoindole via N-tosyl-1-(1-phenylvinyl)-2,4-dihydro-2H-pyrrole (as intermediate product of the enyne methathesis), too, the yield is not influenced by whether $BCl_3$ is added right at the beginning together with the Grubbs (I) catalyst in a one-pot reaction or whether it is, in a sequential procedure, added only in the second step of the Diels-Alder reaction. These experiments show that the activity of the Grubbs (I) catalyst is not reduced by addition of boron trichloride or aluminium trichloride. However, there is no evidence that addition of boron trichloride or aluminium trichloride improves the catalyst activity.

Since the metathesis reaction is enjoying increasing popularity both in the field of low molecular weight chemistry and for polymers such as nitrile rubbers, there is, despite the existing prior art, a continuing need for improved catalyst systems for metathesis reactions and in particular the reduction of the molecular weight of nitrile rubber by metathesis. This applies all the more in view of the fact that, on the basis of the available prior art, results of one metathesis reaction cannot readily be applied to another.

In the light of this background, it is an object of the present invention to provide novel catalyst systems which can be used universally in various types of metathesis reactions, lead to activity increases for a wide variety of metathesis catalysts used as a basis and thus allow a reduction in the amount of catalyst and thus, in particular, the amounts of noble metal present therein. For the metathetic degradation of nitrile rubber in particular, possible ways of increasing the activity of the catalyst used without gelling of the nitrile rubber should be found.

SUMMARY OF THE INVENTION

It has surprisingly been found that the activity of metathesis catalysts can be increased significantly when they are used in combination with fluorine-containing boron compounds. In particular, it has been found that the reduction of the molecular weight of nitrile rubber by metathesis can be significantly improved when the metathesis catalyst is used as a system in combination with fluorine-containing boron compounds. This combination increases the reaction rate of metathesis reactions and, particularly in the metathesis of NBR, significantly narrower molecular weight distributions and lower molecular weights can be obtained without gelling occurring. At the same time, the amount of metathesis catalyst can be reduced by the addition of the fluorine-containing boron compounds.

DETAILED DESCRIPTION OF THE INVENTION

The invention accordingly provides a process for the metathetic degradation of nitrile rubbers, in which the nitrile rubber is subjected to a metathesis reaction in the presence of a catalyst system, wherein the catalyst system contains a metathesis catalyst which is a complex catalyst based on a metal of transition group 6 or 8 of the Periodic Table and has at least one ligand bound in a carbene-like fashion to the metal and also at least one compound of the general formula (Z)

$$BF_mX_n * D_v \quad (Z)$$

where
m is 1, 2 or 3,
n is 0, 1 or 2 and at the same time
m+n=3 and
v is 1, 2, 3, 4 or 5,
X is chlorine, bromine, iodine, an —OR or —NR$_2$ group, where the radicals R are each, independently of one another, a linear, branched, aliphatic, cyclic, heterocyclic or aromatic radical which has 1-33 carbon atoms and may optionally have from 1 to 15 further heteroatoms, and
D is a compound having at least one free electron pair, where D contains at least one heteroatom which is preferably selected from the group consisting of oxygen, sulphur, nitrogen, phosphorus, arsenic and antimony.

In a preferred embodiment of the invention, compounds of the general formula (Z) in which X is chlorine, bromine or an —OR or —NR$_2$ group, where the radicals R are each, independently of one another, straight-chain or branched $C_1$-$C_{30}$-alkyl, preferably $C_1$-$C_{20}$-alkyl, particularly preferably $C_1$-$C_{12}$-alkyl, $C_3$-$C_{20}$-cycloalkyl, preferably $C_3$-$C_{10}$-cycloalkyl, particularly preferably $C_5$-$C_8$-cycloalkyl, $C_2$-$C_{20}$-alkenyl, preferably $C_2$-$C_{18}$-alkenyl, $C_2$-$C_{20}$-alkynyl, preferably $C_2$-$C_{18}$-alkynyl, $C_6$-$C_{24}$-aryl, preferably $C_6$-$C_{14}$-aryl, $C_4$-$C_{23}$-heteroaryl, where these heteroaryl radicals have at least one heteroatom, preferably nitrogen or oxygen, or are in each case a radical of the general formula (—CHZ$^1$-CHZ$^1$-A$^2$-)$_p$—CH$_2$—CH$_3$, where p is an integer from 1 to 10, the radicals Z$^1$ are identical or different and are each hydrogen or methyl, with the radicals Z$^1$ located on adjacent carbon atoms preferably being different, and A$^2$ is oxygen, sulphur or —NH, are used in the catalyst system.

In a particularly preferred embodiment of the invention, compounds of the general formula (Z) in which the radicals R in the radicals OR and NR$_2$ are each methyl, ethyl, n-propyl, i-propyl, n-butyl, i-butyl, tert-butyl, n-pentyl, i-pentyl, tert-pentyl, hexyl, decyl, dodecyl, oleyl, phenyl or sterically hindered phenyl are used in the catalyst system.

In the general formula (Z), the BF$_m$X$_n$ moiety is preferably BF$_3$, BF$_2$Cl, BFCl$_2$BF$_2$Br, BFBr$_2$, BF$_2$(OC$_2$H$_5$), BF(OC$_2$H$_5$)$_2$, BF$_2$(CH$_3$) and BF(CH$_3$)$_2$. BF$_m$X$_n$ is particularly preferably BF$_3$.

In the compounds of the general formula (Z), D can have the following meanings of the general formulae (2) to (16)

| | |
|---|---|
| OR$_2$ | (2) |
| ROH | (3) |
| R—COOH | (4) |
| SR$_2$ | (5) |
| O=SR$_2$ | (6) |
| O$_2$SR$_2$ | (7) |
| NHR$_2$, NH$_2$R, NR$_3$, | (8a, 8b, 8c) |
| YR$_3$, R$_2$Y—YR$_2$ | (9a, 9b) |
| O=YR$_3$ | (10) |
| O=Y(OR)$_2$ | (11) |
| O=Y(OR)$_3$ | (12) |
| O=CR$_2$ | (13) |
| S=YR$_3$ | (14) |
| H$_2$SO$_4$ | (15) |
| RSO$_3$H | (16) | where Y is phosphorus, arsenic or antimony and the radicals R are identical or different and are each hydrogen or a linear, branched, aliphatic, cyclic, heterocyclic or aromatic radical which has 1-33 carbon atoms and may be bridged and can optionally have from 1 to 15 further heteroatoms, preferably nitrogen or oxygen, or can optionally be substituted. Preference is given to the radicals R each being, independently of one another, hydrogen, straight-chain or branched $C_1$-$C_{30}$-alkyl, particularly preferably straight-chain or branched $C_1$-$C_{12}$-alkyl, $C_3$-$C_{20}$-cycloalkyl, particularly preferably $C_5$-$C_8$-cycloalkyl, straight-chain or branched $C_2$-$C_{20}$-alkenyl, particularly preferably straight-chain or branched $C_2$-$C_{14}$-alkenyl, straight-chain or branched $C_2$-$C_{20}$-alkynyl, particularly preferably straight-chain or branched $C_2$-$C_{14}$-alkynyl, $C_6$-$C_{24}$-aryl, particularly preferably $C_6$-$C_{14}$-aryl, where all the abovementioned radicals may each optionally be substituted by one or more alkyl, halogen, preferably fluorine or chlorine, alkoxy, aryl or heteroaryl radicals. If two radicals R are present in one of the formulae (2)-(16), these can also be bridged with inclusion of the common atom or atoms to which they are bound to form a cyclic group which can be aliphatic or aromatic in nature, may optionally be substituted and can additionally contain one or more heteroatoms, preferably oxygen or nitrogen.

Examples of compounds D of the general formula (2) are: water, dimethyl ether, diethyl ether, di-n-propyl ether, di-i-propyl ether, di-n-butyl ether, di-i-butyl ether, di-t-butyl ether, methyl t-butyl ether, dimethoxyethane, di-n-butoxyethane, diphenyl ether, methylphenyl ether, ethylphenyl ether, tetrahydrofuran, tetrahydropyran. Preference is given to water, diethyl ether, tetrahydrofuran and tetrahydropyran.

Examples of compounds D of the general formula (3) are: methanol, ethanol, n-propanol, i-propanol, n-butanol, t-butanol, phenol, catechol, anisole and salicylic acid.

Examples of compounds D of the general formula (4) are: formic acid, acetic acid, propionic acid, citric acid, trichloroacetic acid, trifluoroacetic acid and benzoic acid.

Examples of compounds D of the general formula (5) are: hydrogen sulphide, methyl mercaptan, n-hexyl mercaptan, t-butyl mercaptan, t-nonyl mercaptan, n-dodecyl mercaptan and t-dodecyl mercaptan, dimethyl sulphide, diethyl sulphide, diisopropyl sulphide, tetrahydrothiophene and diphenyl sulphide.

Examples of compounds D of the general formula (6) are dimethyl sulphoxide, diethyl sulphoxide, diisopropyl sulphoxide, butyl methyl sulphoxide and tetrahydrothiophene 1-oxide.

Examples of compounds D of the general formula (7) are dimethyl sulphone, diethyl sulphone, diisopropyl sulphone, butyl methyl sulphone and Sulpholane (tetrahydrothiophene 1,1-dioxide).

Examples of compounds D of the general formulae (8a, 8b and 8c) are: trimethylamine, triethylamine, triethanolamine, aniline, methylaniline, dimethylaniline, pyridine, pyrimidine, pyrrole, pyrrolidine, tetramethylethylenediamine, tetraethylethylenediamine, ammonia, methylamine, ethylamine, propylamine, diethylamine and dimethylamine.

Examples of compounds D of the general formula (9a) are: phosphine, trimethylphosphine, triethylphosphine, triisopropylphosphine, tricyclohexylphosphine, triphenylphosphine and tris(sulphonophenyl)phosphane and salts thereof.

An example of a compound D of the general formula (9b) is tetraphenyldiphosphane.

Particular preference is given to using water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid as compounds D.

For the purposes of the present patent application and invention, all definitions mentioned above and below, in general terms or in preferred ranges, of radicals, parameters or explanations can be combined with one another, i.e. also between the respective ranges and preferred ranges, in any desired way.

The term "substituted" used in the present patent application in relation to the various types of metathesis catalysts or compounds of the general formula (Z) means that a hydrogen atom on the indicated radical or atom has been replaced by one of the groups indicated in each case, with the proviso that the valency of the indicated atom is not exceeded and the substitution leads to a stable compound.

The metathesis catalysts to be used in the process of the invention are complex catalysts based on a metal of transition group 6 or 8 of the Periodic Table. These complex catalysts have the common structural feature that they have at least one ligand which is bound to the metal in a carbene-like fashion. In a preferred embodiment, the complex catalyst has two carbene ligands, i.e. two ligands which are bound in a carbene-like fashion to the central metal of the complex. As metals of transition groups 6 and 8 of the Periodic Table, preference is given to molybdenum, tungsten, osmium and ruthenium.

Suitable catalyst systems are, for example, systems which comprise at least one compound of the general formula (Z) and also a catalyst of the general formula A),

where
M is osmium or ruthenium,
$X^1$ and $X^2$ are identical or different and are two ligands, preferably anionic ligands,
L represents identical or different ligands, preferably uncharged electron donors,
the radicals R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these radicals can all optionally be substituted by one or more alkyl, halogen, alkoxy, aryl or heteroaryl radicals or alternatively the two radicals R are bridged with inclusion of the common C atom to which they are bound to form a cyclic group which can be aliphatic or aromatic in nature, may optionally be substituted and can contain one or more heteroatoms.

In a preferred embodiment, these catalyst systems comprise a catalyst of the general formula (A) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

In particularly preferred catalysts of the general formula (A), one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals can all be substituted by one or more alkyl, halogen, alkoxy, aryl or heteroaryl radicals.

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$ alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals too may optionally be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), L represents identical or different ligands and preferably uncharged electron donors.

The two ligands L can, for example, each be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_{10}$-alkylphosphine or $C_3$-$C_{20}$-cycloalkylphosphine ligand, a sulphonated $C_6$-$C_{24}$-arylphosphine or sulphonated $C_1$-$C_{10}$-alkylphosphine ligand, a $C_6$-$C_{24}$-arylphosphinite or $C_1$-$C_{10}$-alkylphosphinite ligand, a $C_6$-$C_{24}$-arylphosphonite or $C_1$-$C_{10}$-alkylphosphonite ligand, a $C_6$-$C_{24}$-aryl phosphite or $C_1$-$C_{10}$-alkyl phosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, which can all be substituted by a phenyl group which may in turn optionally be substituted by a halogen, $C_1$-$C_5$-alkyl or $C_1$-$C_5$-alkoxy radical.

The term "phosphine" includes, for example, $PPh_3$, P(p-tolyl)$_3$, P(o-tolyl)$_3$, Pphenyl($CH_3$)$_2$, P($CF_3$)$_3$, P(p-$FC_6R_4$)$_3$, P(p-$CF_3C_6H_4$)$_3$, P($C_6H_4$—$SO_3Na$)$_3$, P($CH_2C_6H_4$—$SO_3Na$)$_3$, P(isopropyl)$_3$, P(CH$CH_3$($CH_2CH_3$))$_3$, P(cyclopentyl)$_3$, P(cyclohexyl)$_3$, P(neopentyl)$_3$ and P(neophenyl)$_3$.

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstiben.

The term "sulphonate" includes, for example, trifluoromethanesulphonate, tosylate and mesylate.

The term "sulphoxide" includes, for example, $(CH_3)_2S(=O)$ and $(C_6H_5)_2SO$.

The term "thioether" includes, for example, $CH_3SCH_3$, $C_6H_5SCH_3$, $CH_3OCH_2CH_2SCH_3$ and tetrahydrothiophene.

For the purposes of the present patent application, the term "pyridine" serves as collective term for all nitrogen-containing ligands as are mentioned, for example, in WO-A-03/011455. Examples are: pyridine, picolines (α-, β-, and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If one or both of the ligands L is an imidazolidine radical (Im), this usually has a structure of the general formula (IIa) or (IIb),

(IIa)

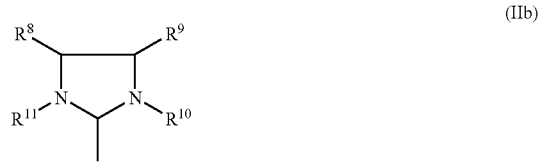

(IIb)

where
$R^8, R^9, R^{10}, R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{70}$-alkynyloxy, $C_6$-$C_{20}$-aryloxy, $C_2$-$C_{70}$-alkoxycarbonyl, $C_1$-$C_{70}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

One or more of the radicals $R^8, R^9, R^{10}, R^{11}$ can optionally be substituted, independently of one another, by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Purely for the purposes of clarification, it may be added that the structures of the imidazolidine radical shown in the general formulae (IIa) and (IIb) in the present patent application are equivalent to the structures (IIa') and (IIb') for this imidazolidine radical (Im) which are frequently also to be found in the literature and emphasize the carbene character of the imidazolidine radical. This applies analogously to the associated preferred structures (IIIa)-(IIIf) shown below.

(IIa')

(IIb')

In a preferred embodiment of the catalysts of the general formula (A), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn optionally be substituted by one or more further radicals selected from the group consisting of straight-chain or branched $C_1$-$C_{10}$- alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, particularly adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals as meanings of $R^{10}$ and $R^{11}$ may optionally be substituted by one or ore further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboxalkoxy, carbamate and halogen.

In particular, the radicals $R^{10}$ and $R^{11}$ can be identical or different and are each i-propyl, neopentyl, adamantyl, mesityl or 2,6-diisopropylphenyl.

Particularly preferred imidazolidine radicals (Im) have the following structures (IIIa) to (IIIf), where Ph is in each case a phenyl radical, Bu is a butyl radical and Mes is in each case a 2,4,6-trimethylphenyl radical or Mes is alternatively in all cases 2,6-diisopropylphenyl.

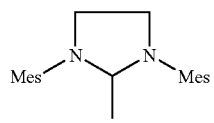

(IIIa)

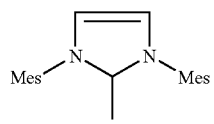

(IIIb)

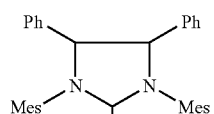

(IIIc)

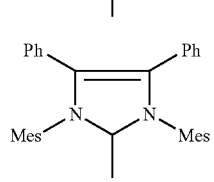

(IIId)

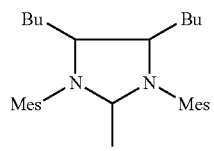

(IIIe)

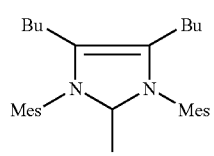

(IIIf)

Various representatives of the catalysts of the formula (A) are known in principle, e.g. from WO-A-96/04289 and WO-A-97/06185.

As an alternative to the preferred Im radicals, one or both of the ligands L in the general formula (A) are preferably also identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one or both of the ligands L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Particular preference is given to catalyst systems which comprise at least one compound of the general formula (Z) together with one of the following two catalysts which come under the general formula (A) and have the structures (IV) (Grubbs (I) catalyst) and (V) (Grubbs (II) catalyst), where Cy is cyclohexyl and Mes is meistyl.

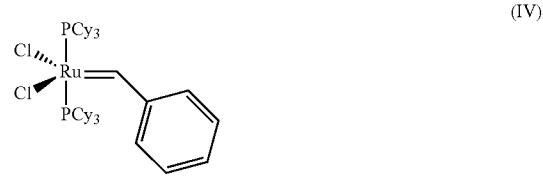

(IV)

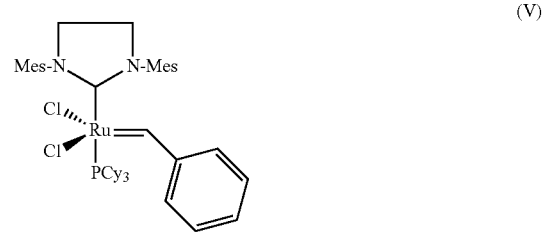

(V)

In a further embodiment, a catalyst system comprising at least one compound of the general formula (Z) together with a catalyst of the general formula (A1),

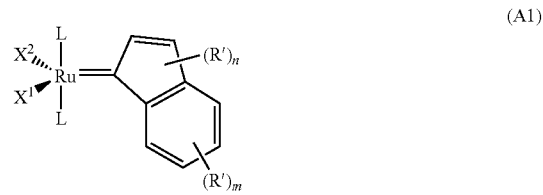

(A1)

where $X^1$, $X^2$ and L can have the same general, preferred and particularly preferred meanings as in the general formula (A), n is 0, 1 or 2, m is 0, 1, 2, 3 or 4 and the radicals R' are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all be substituted by one or more alkyl, halogen, alkoxy, aryl or heteroaryl radicals, is used in the process of the invention.

As preferred catalyst which comes under the general formula (A1), it is possible to use, for example, the catalyst of the formula (VI) below, where Mes is in each case 2,4,6-trimethylphenyl and Ph is phenyl.

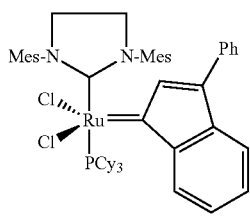

This catalyst which is also referred to in the literature as "Nolan catalyst" is known, for example, from WO-A-2004/112951.

The particularly preferred catalyst systems comprise the catalysts of the formula (IV), (V) or (VI) together with a compound of the general formula (Z) in which the $BF_mX_n$ moiety is $BF_3$, $BF_2Cl$, $BFCl_2BF_2Br$, $BFBr_2$, $BF_2(OC_2H_5)$, $BR(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

Further suitable catalyst systems are systems which comprise at least one compound of the general formula (Z) together with a catalyst of the general formula (B),

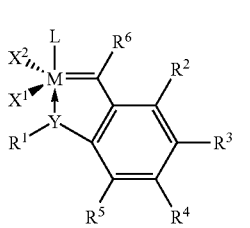

where
M is ruthenium or osmium,
$X^1$ and $X^2$ are identical or different ligands, preferably anionic ligands,
Y is oxygen (O), sulphur (S), an N—$R^1$ radical or a P—$R^1$ radical, where $R^1$ has the meanings mentioned below,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical,
$R^6$ is hydrogen or an alkyl, alkenyl, alkynyl or aryl radical and
L is a ligand which has the same meanings as mentioned for the formula (A).

These catalyst systems preferably comprise the catalyst of the general formula (B) together with a compound of the general formula (Z) in which the $BF_mX_n$ moiety is $BF_3$, $BF_2Cl$, $BFCl_2$, $BF_2Br$, $BFBr_2$, $BF_2(OEt)$, $BF(OEt)_2$, $BF_2(Me)$ or $BF(Me)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

The catalysts of the general formula (B) are known in principle. Representatives of this class of compounds are the catalysts described by Hoveyda et al. in US 2002/0107138 A1 and Angew. Chem. Int. Ed. 2003, 42, 4592 and the catalysts which are described by Grela in WO-A-2004/035596, Eur. J. Org. Chem. 2003, 963-966 and Angew. Chem. Int. Ed. 2002, 41, 4038 and in J. Org. Chem. 2004, 69, 6894-96 and Chem. Eur. J. 2004, 10, 777-784. The catalysts are commercially available or can be prepared as described in the literature references cited.

In the catalysts of the general formula (B), L is a ligand which usually has an electron donor function and can have the same general, preferred and particularly preferred meanings as L in the general formula (A).

In addition, L in the general formula (B) is preferably a $P(R^7)_3$ radical, where the radicals $R^7$ are each, independently of one another, $C_1$-$C_6$-alkyl, $C_3$-$C_8$-cycloalkyl or aryl, or else a substituted or unsubstituted imidazolidine radical ("Im").

$C_1$-$C_6$-alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-cycloalkyl encompasses cyclopropyl, cyclobutyl, cyclopentyl, cyclohexyl, cycloheptyl and cyclooctyl.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl and anthracenyl.

The imidazolidine radical (Im) usually has a structure of the general formula (IIa) or (IIb),

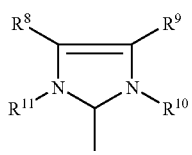

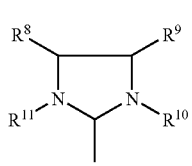

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

One or more of the radicals $R^8$, $R^9$, $R^{10}$, $R^{11}$ can optionally be substituted, independently of one another, by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

In a preferred embodiment of the catalyst system used according to the invention, at least one compound of the general formula (Z) is used together with catalysts of the general formula (B) in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn optionally be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a further preferred embodiment of the catalyst system used according to the invention, at least one compound of the general formula (Z) is used together with catalysts of the general formula (B) in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, or $C_6$-$C_{10}$-arylsulphonate, particularly preferably p-toluene sulphonate.

The abovementioned radicals as meanings of $R^{10}$ and $R^{11}$ may optionally be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl or mesityl.

Particularly preferred imidazolidine radicals (Im) have the abovementioned structures (IIIa-IIIf), where Mes is in each case 2,4,6-trimethylphenyl.

In the catalysts of the general formula (B), $X^1$ and $X^2$ are identical or different and can each be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals may also optionally be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, which can all optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, where the latter may optionally be interrupted by one or more double or triple bonds or one or more heteroatoms, preferably oxygen or nitrogen. $R^1$ is particularly preferably a straight-chain or branched $C_1$-$C_{12}$-alkyl radical.

The $C_3$-$C_{20}$-cycloalkyl radical is, for example, cyclopropyl, cyclobutyl, cyclopentyl, cyclohexyl, cycloheptyl or cyclooctyl.

The $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

The $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl and anthracenyl.

In the general formula (B), the radicals $R^2$, $R^3$, $R^4$ and $R^5$ are identical or different and can each be hydrogen, or an organic or inorganic radical.

In a useful embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, which may all optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl, which may all optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cycloalkyl, straight-chain or branched $C_1$-$C_{20}$-alkoxy or $C_6$-$C_{24}$-aryl, preferably phenyl or naphthyl. The $C_1$-$C_{30}$-alkyl and $C_1$-$C_{20}$-alkoxy radicals can optionally be interrupted by one or more double or triple bonds or one or more heteroatoms, preferably oxygen or nitrogen.

Furthermore, two or more of the radicals $R^2$, $R^3$, $R^4$ and $R^5$ can be bridged via aliphatic or aromatic structures. For example, $R^3$ and $R^4$ together with the carbon atoms to which they are bound in the benzene ring of the formula (B) can form a few fused-on benzene ring, so that a naphthyl structure results.

In the general formula (B), the radical $R^6$ is hydrogen or an alkyl, alkenyl, alkynyl or aryl radical. $R^6$ is preferably hydrogen or a $C_1$-$C_{30}$-alkyl, $C_2$-$C_{20}$-alkenyl, $C_2$-$C_{20}$-alkynyl or $C_6$-$C_{24}$-aryl radical. $R^6$ is particularly preferably hydrogen.

Further suitable catalyst systems are those comprising at least one compound of the general formula (Z) together with a catalyst of the general formula (B1),

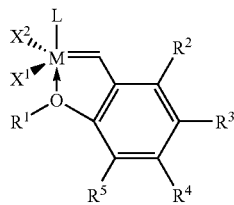
(B1)

where
M, L, $X^1$, $X^2$, $R^1$, $R^2$, $R^3$, $R^4$ and $R^5$ can have the general, preferred and particularly preferred meanings given for the general formula (B).

These catalyst systems preferably comprise the catalyst of the general formula (B1) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

The catalysts of the general formula (B1) are known in principle from, for example, US 2002/0107138 A1 (Hoveyda et al.) and can be obtained by the preparative methods indicated there.

Particular preference is given to catalyst systems comprising catalysts of the general formula (B1) in which
M is ruthenium,
$X^1$ and $X^2$ are both halogen, in particular both chlorine,
$R^1$ is a straight-chain or branched $C_1$-$C_{12}$ alkyl radical,
$R^2$, $R^3$, $R^4$, $R^5$ have the general and preferred meanings given for the general formula (B) and
L has the general and preferred meanings given for the general formula (B).

Especial preference is given to catalyst systems comprising catalysts of the general formula (B1) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formulae (IIa) or (IIb),

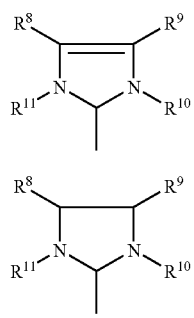
(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl, where the above-mentioned radicals may each be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn also be substituted by one or more radicals, preferably radicals selected from the group consisting of halogen, in particular chlorine or bromine, $C_1$-$C_5$-alkyl, $C_1$-$C_5$-alkoxy and phenyl.

Very particular preference is given to a catalyst system comprising at least one compound of the general formula (Z) and a catalyst which comes under the general structural formula (B1) and has the formula (VII), where Mes is in each case 2,4,6-trimethylphenyl.

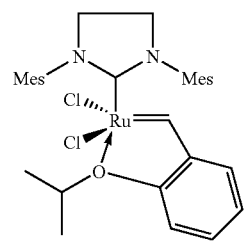
(VII)

This catalyst (VII) is also referred to as "Hoveyda catalyst" in the literature.

Further suitable catalyst systems are those which comprise at least one compound of the general formula (Z) together with a catalyst which comes under the general structural formula (B1) and has one of the formulae (VIII), (IX), (X), (XI), (XII), (XIII), (XIV) and (XV) below, where Mes is in each case 2,4,6-trimethylphenyl.

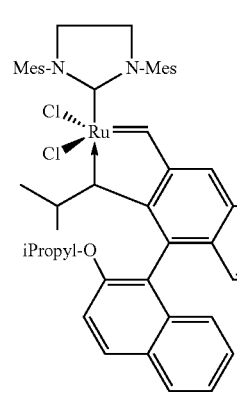
(VIII)

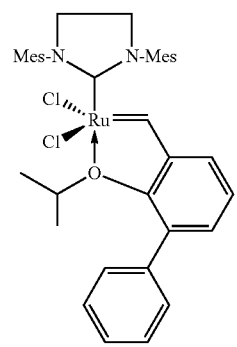
(IX)

-continued (X)
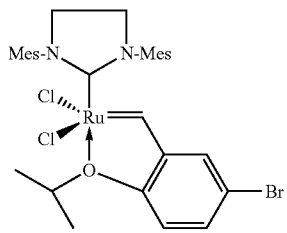

(XI)
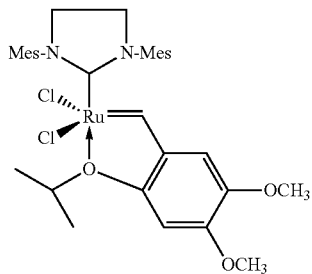

(XII)
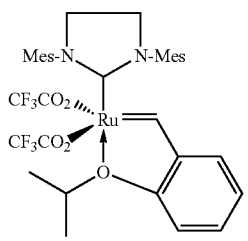

(XIII)
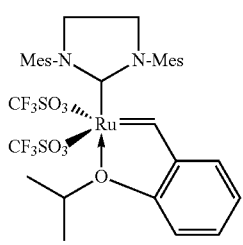

(XIV)
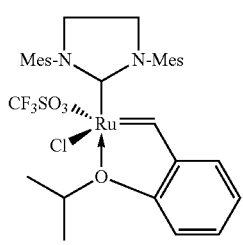

(XV)
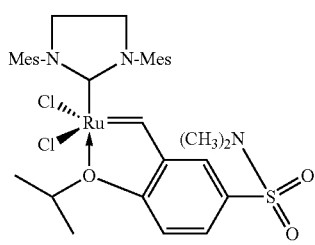

A further catalyst system which can be used according to the invention comprises at least one compound of the general formula (Z) and a catalyst of the general formula (B2),

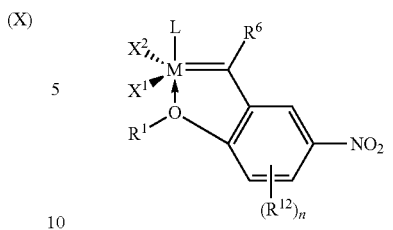

(B2)

where

M, L, $X^1$, $X^2$, $R^1$ and $R^6$ have the general and preferred meanings given for the formula (B), the radicals $R^{12}$ are identical or different and have the general and preferred meanings given for the radicals $R^2$, $R^3$, $R^4$ and $R^5$ in the formula (B), with the exception of hydrogen, and n is 0, 1, 2 or 3.

These catalyst systems preferably comprise the catalyst of the general formula (B2) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BR(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

The catalysts of the general formula (B2) are known in principle from, for example, WO-A-2004/035596 (Greta) and can be obtained by the preparative methods indicated there.

Particular preference is given to using catalyst systems comprising at least one compound of the general formula (Z) and a catalyst of the general formula (B2) in which M is ruthenium, $X^1$ and $X^2$ are both halogen, in particular both chlorine, $R^1$ is a straight-chain or branched $C_1$-$C_{12}$ alkyl radical, $R^{12}$ has the meanings given for the general formula (B2), n is 0, 1, 2 or 3, $R^6$ is hydrogen and L has the meanings given for the general formula (B).

Especial preference is given to using catalyst systems comprising at least one compound of the general formula (Z) and a catalyst of the general formula (B2) in which M is ruthenium, $X^1$ and $X^2$ are both chlorine, $R^1$ is an isopropyl radical, n is 0 and L is a substituted or unsubstituted imidazolidine radical of the formulae (IIa) or (IIb), where $R^8$, $R^9$, $R^{10}$, $R^{11}$ are identical or different and have the meanings given for the especially preferred catalysts of the general formula (B1).

A particularly suitable catalyst system is a system comprising a catalyst of the structure (XVI) below and a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

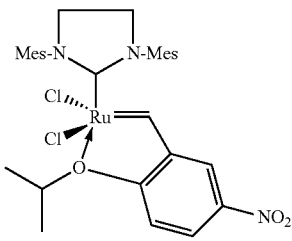

(XVI)

The catalyst (XVI) is also referred to as "Grela catalyst" in the literature.

A further suitable catalyst system comprises at least one compound of the general formula (Z) and a catalyst which comes under the general formula (B2) and has the structure (XVII) below, where Mes is in each case 2,4,6-trimethylphenyl.

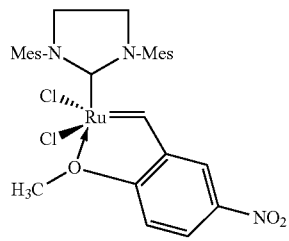

(XVII)

An alternative embodiment relates to catalyst systems comprising at least one compound of the general formula (Z) and a dendritic catalyst of the general formula (B3),

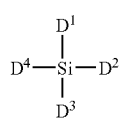

(B3)

where $D^1$, $D^2$, $D^3$ and $D^4$ each have a structure of the general formula (XVIII) below which is bound via the methylene group shown at right to the silicon of the formula (B3)

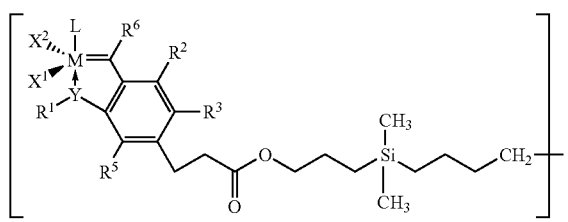

(XVIII)

where
M, L, $X^1$, $X^2$, $R^1$, $R^2$, $R^3$, $R^5$ and $R^6$ can have the general and preferred meanings given for the general formula (B).

These catalyst systems preferably contain the catalyst of the general formula (B3) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

The catalysts of the general formula (B3) are known from US 2002/0107138 A1 and can be prepared according to the information given there.

A further alternative embodiment relates to the use of a catalyst system comprising at least one compound of the general formula (Z) and a catalyst of the formula (B4),

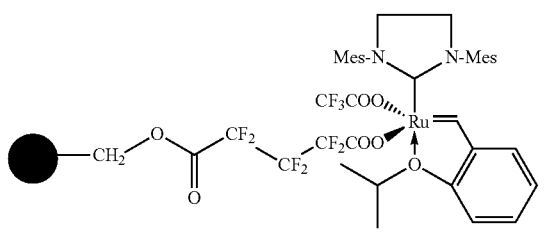

(B4)

where the symbol ● represents a support.

The support is preferably a poly(styrenedivinylbenzene) copolymer (PS-DVB). The catalysts of the formula (B4) are known in principle from Chem. Eur. J. 2004 10, 777-784 and can be obtained by preparative methods described there.

All the abovementioned catalysts of type (B) can either be used as such in the reaction mixture of the NBR metathesis or can be applied to and immobilized on a solid support. Materials suitable as solid phases or supports are materials which firstly are inert towards the reaction mixture of the metathesis and secondly do not impair the activity of the catalyst. It is possible to use, for example, metals, glass, polymers, ceramic, organic polymer spheres or inorganic sol-gels, carbon black, silica, silicates, calcium carbonate and barium sulphate for immobilizing the catalyst.

A further embodiment relates to the use of catalyst systems comprising at least one compound of the general formula (Z) and a catalyst of the general formula (C),

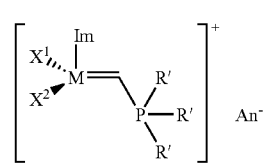

(C)

where
M is ruthenium or osmium,
$X^1$ and $X^2$ are identical or different and are anionic ligands,
the radicals R' are identical or different and are organic radicals,
Im is a substituted or unsubstituted imidazolidine radical and
An is an anion.

These catalyst systems preferably contain the catalyst of the general formula (C) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

The catalysts of the general formula (C) are known in principle (see, for example, Angew. Chem. Int. Ed. 2004, 43, 6161-6165).

$X^1$ and $X^2$ in the general formula (C) can have the same general, preferred and particularly preferred meanings as in the formulae (A) and (B).

The imidazolidine radical (Im) usually has a structure of one of the general formulae (IIa) and (IIb) which have already been mentioned for the catalyst type of the formulae (A) and (B) and can also have all the structures mentioned as preferred there, in particular those of the formulae (IIIa)-(IIIf).

The radicals R' in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may optionally be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl and anthracenyl.

The radicals R' in the general formula (C) are preferably identical and are preferably each phenyl, cyclohexyl, cyclopentyl, isopropyl, o-tolyl, o-xylyl or mesityl.

A further alternative embodiment relates to the use of a catalyst system comprising at least one compound of the general formula (Z) and a catalyst of the general formula (D),

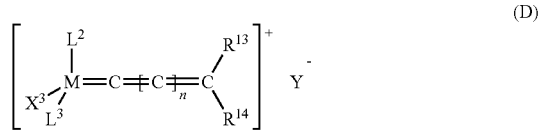

(D)

where
M is ruthenium or osmium,
$R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$X^3$ is an anionic ligand,
$L^2$ is an uncharged π-bonded ligand, either monocyclic or polycyclic,
$L^3$ is a ligand from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines,
$Y^-$ is a noncoordinating anion and
n is 0, 1, 2, 3, 4 or 5.

These catalyst systems preferably contain the catalyst of the general formula (D) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

A further embodiment of the invention relates to the use of a catalyst system comprising at least one compound of the general formula (Z) and a catalyst of the general formula (E),

(E)

where
$M^2$ is molybdenum or tungsten,
$R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$R^{17}$ and $R^{18}$ are identical or different and are each a substituted or halogen-substituted $C_1$-$C_{20}$ alkyl, $C_6$-$C_{24}$-aryl, $C_6$-$C_{30}$-aralkyl radical or a silicone-containing analogue thereof.

These catalyst systems preferably contain the catalyst of the general formula (E) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

A further alternative embodiment relates to the use of a catalyst system comprising at least one compound of the general formula (Z) and a catalyst of the general formula (F),

(F)

where
M is ruthenium or osmium,
$X^1$ and $X^2$ are identical or different and are anionic ligands which can have all the meanings of $X^1$ and $X^2$ given for the general formulae (A) and (B),
L represents identical or different ligands which can have all the meanings of L given for the general formulae (A) and (B),
$R^{19}$ and $R^{20}$ are identical or different and are each hydrogen or substituted or unsubstituted alkyl.

These catalyst systems preferably contain the catalyst of the general formula (F) together with a compound of the general formula (Z) in which the $BF_mX_n$ moiety is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3.

A further alternative embodiment relates to the use according to the invention of a catalyst system comprising at least one compound of the general formula (Z) and a catalyst of the general formula (G), (H) or (K),

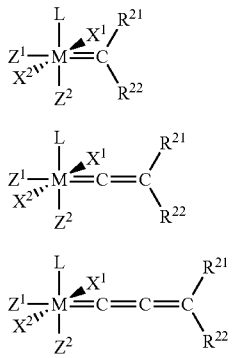

where

M is osmium or ruthenium, $X^1$ and $X^2$ are identical or different and are two ligands, preferably anionic ligands, L is a ligand, preferably an uncharged electron donor, $Z^1$ and $Z^2$ are identical or different and are uncharged electron donors, $R^{21}$ and $R^{22}$ are each, independently of one another, hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl, each of which may be substituted by one or more radicals selected from among alkyl, halogen, alkoxy, aryl and heteroaryl.

The catalysts of the general formulae (G), (H) and (K) are known in principle, e.g. from WO 2003/011455 A1, WO 2003/087167 A2, Organometallics 2001, 20, 5314 and Angew. Chem. Int. Ed. 2002, 41, 4038. The catalysts are commercially available or can be synthesized by the preparative methods indicated in the abovementioned literature references.

$Z^1$ and $Z^2$

In the catalyst systems which can be used according to the invention, use is made of catalysts of the general formulae (G), (H) and (K) in which $Z^1$ and $Z^2$ are identical or different and are uncharged electron donors. These ligands are usually weakly coordinating. They are typically optionally substituted heterocyclic groups. These can be 5- or 6-membered monocyclic groups having from 1 to 4, preferably from 1 to 3 and particularly preferably 1 or 2, heteroatoms or be bicyclic or polycyclic structures made up of 2, 3, 4 or 5 such 5- or 6-membered monocyclic groups, where all the abovementioned groups may optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$ heteroaryl radicals, which may each be substituted in turn by one or more groups, preferably groups selected from the group consisting of halogen, in particular chlorine or bromine, $C_1$-$C_5$-alkyl, $C_1$-$C_5$-alkoxy and phenyl.

Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolidines and pyrroles.

$Z^1$ and $Z^2$ can also be bridged with one another to form a cyclic structure. In this case, $Z^1$ and $Z^2$ form a single bidentate ligand.

L

In the catalysts of the general formulae (G), (H) and (K), L can have the same general, preferred and particularly preferred meanings as L in the general formulae (A) and (B).

$R^{21}$ and $R^{22}$

In the catalysts of the general formulae (G), (H) and (K), $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_2$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where the abovementioned substituents may be substituted by one or more alkyl, halogen, alkoxy, aryl or heteroaryl radicals.

$X^1$ and $X^2$

In the catalysts of the general formulae (G), (H) and (K), $X^1$ and $X^2$ are identical or different and can have the same general, preferred and particularly preferred meanings as given above for $X^1$ and $X^2$ in the general formula (A).

Preference is given to using catalysts of the general formulae (G), (H) and (K) in which M is ruthenium, $X^1$ and $X^2$ are both halogen, in particular chlorine, $R^1$ and $R^2$ are identical or different and are 5- or 6-membered monocyclic groups having from 1 to 4, preferably from 1 to 3 and particularly preferably 1 or 2, heteroatoms or bicyclic or polycyclic structures made up of 2, 3, 4 or 5 such 5- or 6-membered monocyclic groups, where all the abovementioned groups may be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl radicals, $R^{21}$ and $R^{22}$ are identical or different and are each $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl and L has a structure of one of the above-described general formulae (IIa) and (IIb), in particular the formulae (IIIa) to (IIIf).

A particularly preferred catalyst which comes under the general formula (G) has the structure (XIX),

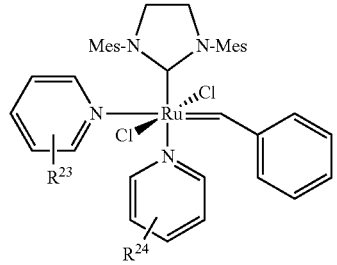
(XIX)

where $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned radicals $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may each in turn be substituted by one or more halogen, preferably fluorine, chlorine or bromine, $C_1$-$C_5$-alkyl, $C_1$-$C_5$-alkoxy or phenyl radicals.

Particularly preferred embodiments of the catalyst of the formula (XIX) have the structure (XIX a) or (XIX b), where $R^{23}$ and $R^{24}$ have the same meanings as given for the formula (XIX).

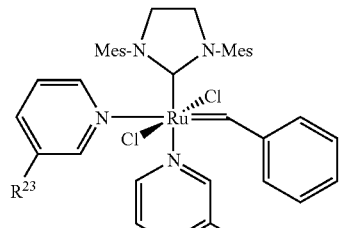
(XIXa)

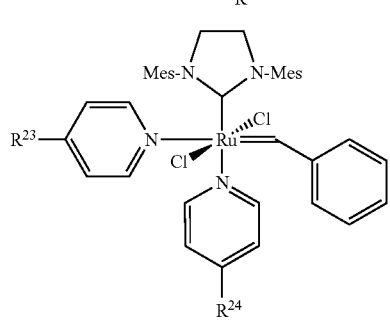
(XIXb)

When $R^{23}$ and $R^{24}$ are each hydrogen, the compound is referred to as "Grubbs III catalyst" in the literature.

Further suitable catalysts which come under the general formulae (G), (H) and (K) have the structural formulae (XX)-(XXXI) below, where Mes is in each case 2,4,6-trimethylphenyl.

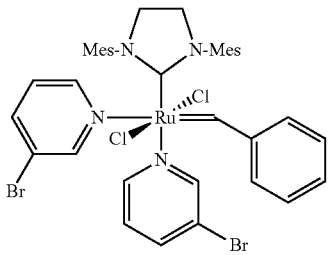
(XX)

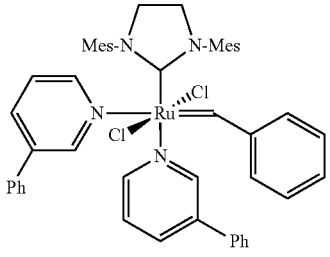
(XXI)

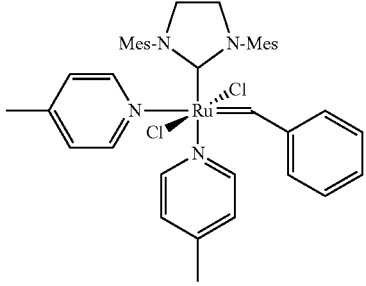
(XXII)

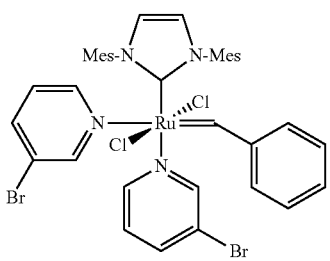
(XXIII)

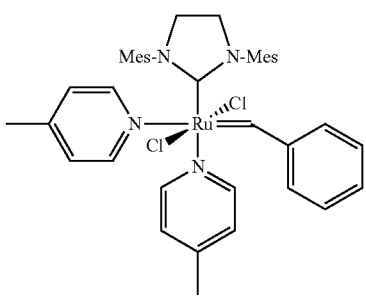
(XXIV)

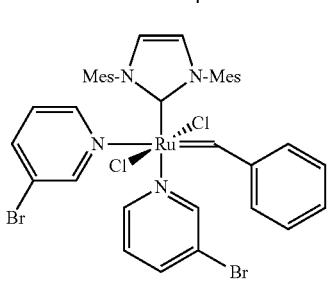
(XXV)

-continued (XXVI)
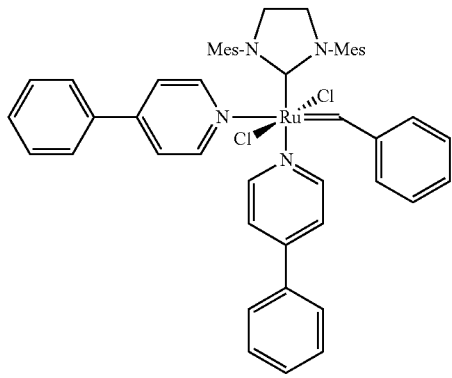

(XXVII)
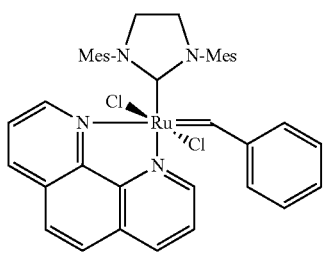

(XXVIII)
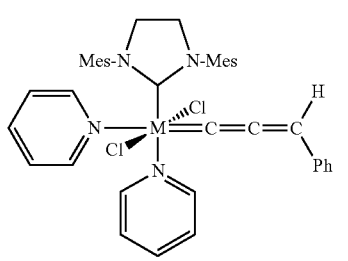

(XXIX)
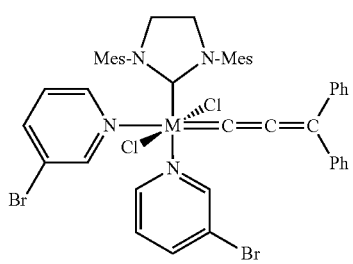

(XXX)
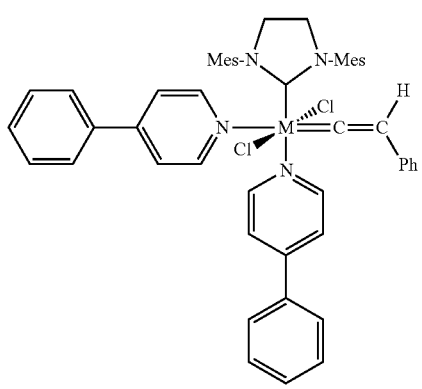

-continued (XXXI)
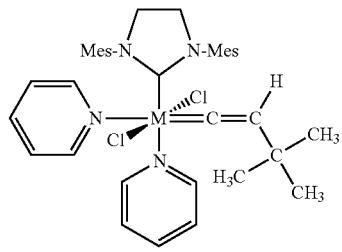

A further alternative embodiment relates to the use according to the invention of a catalyst system comprising at least one compound of the general formula (Z) and a catalyst (N) which has the general structural element (N1), (N1)
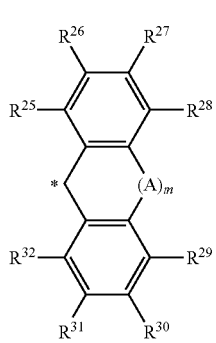

where the carbon atom denoted by "*" is bound via one or more double bonds to the basic catalyst framework
and
$R^{25}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where these radicals can all optionally be substituted by one or more alkyl, halogen, alkoxy, aryl or heteroaryl radicals, or alternatively two directly adjacent radicals from the group consisting of $R^{25}$-$R^{32}$ can be bridged with inclusion of the ring carbons to which they are bound to form a cyclic group, preferably an aromatic system, or alternatively $R^{32}$ may be bridged to another ligand of the ruthenium- or osmium-carbene complex catalyst, m is 0 or 1 and A is oxygen, sulphur, $C(R^{33}R^{34})$, N—$R^{35}$, —$C(R^{36})$=$C(R^{37})$—, —$C(R^{36})(R^{38})$—$C(R^{37})(R^{39})$—, where $R^{33}$-$R^{39}$ are identical or different and can each have the same meanings as the radicals $R^{25}$-$R^{32}$.

The catalysts to be used according to the invention in the catalyst systems have the structural element of the general formula (N1), where the carbon atom denoted by "*" is bound via one or more double bonds to the basic catalyst framework. If the carbon atom denoted by "*" is bound via two or more double bonds to the basic catalyst framework, these double bonds can be cumulated or conjugated.

Such catalysts (N) have been described in the as yet unpublished German patent application number DE 102007039695, which is hereby incorporated by reference for the definition of the catalysts (N) and their preparation, in so far as this is permitted by the applicable jurisdictions.

The catalysts (N) having a structural element of the general formula (N1) include, for example, those of the general formulae (N2a) and (N2b) below,

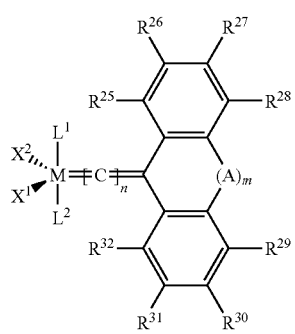
(N2a)

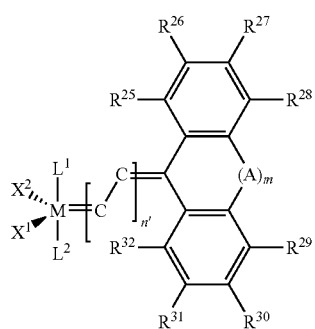
(N2b)

where

M is ruthenium or osmium, $X^1$ and $X^2$ are identical or different and are two ligands, preferably anionic ligands.

$L^1$ and $L^2$ are identical or different ligands, preferably uncharged electron donors, where $L^2$ can, as an alternative, also be bridged with the radical $R^{32}$, n is 0, 1, 2 or 3, preferably 0, 1 or 2, n' is 1 or 2, preferably 1, and $R^{25}$-$R^{32}$, m and A have the same meanings as in the general formula (N)).

In the catalysts of the general formula (N2a), the structural element of the general formula (N1) is bound via a double bond (n=0) or via 2, 3 or 4 cumulated double bonds (in the case of n=1, 2 or 3) to the central metal of the complex catalyst. In the catalysts according to the invention of the general formula (N2b), the structural element of the general formula (N1) is bound via conjugated double bonds to the metal of the complex catalyst. In both cases, a double bond in the direction of the central metal of the complex catalyst is located on the carbon atom denoted by "*".

The catalysts of the general formulae (N10a) and (N10b) thus comprise catalysts in which the general structural elements (N3)-(N9)

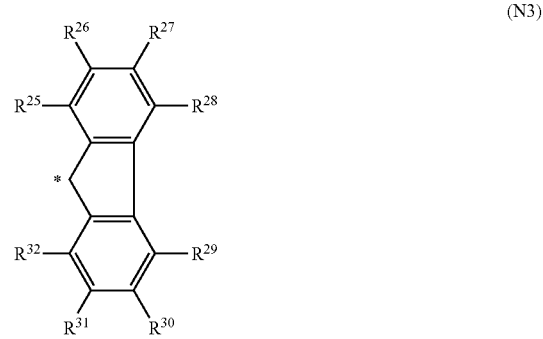
(N3)

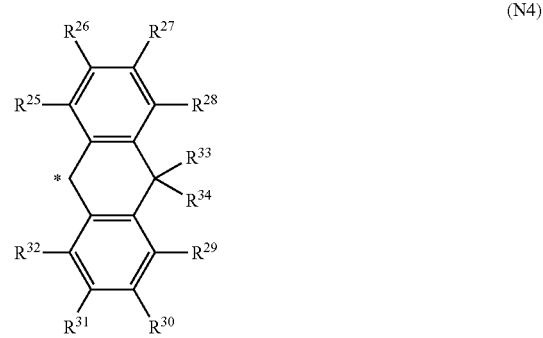
(N4)

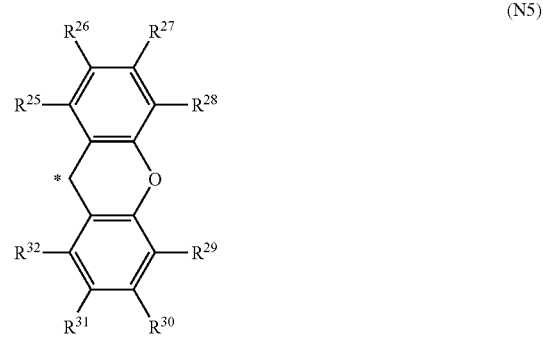
(N5)

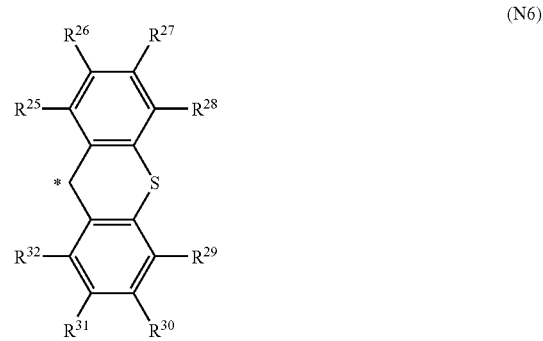
(N6)

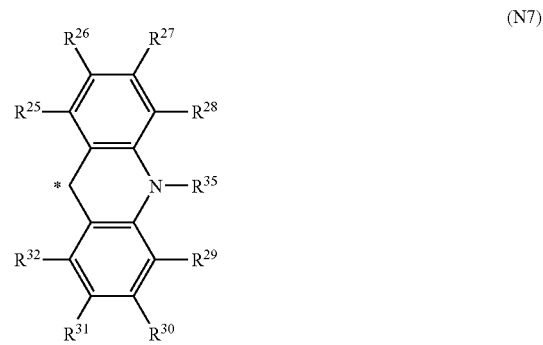
(N7)

-continued

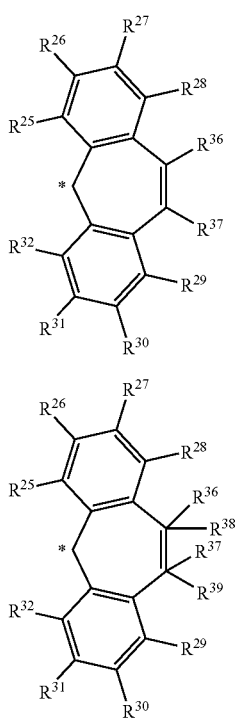

(N8)

(N9)

are bound via the carbon atom denoted by "*" via one or more double bonds to the basic catalyst framework of the general formula (N10a) or (N10b)

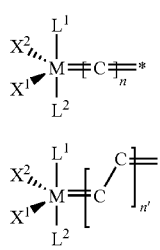

(N10a)

(N10b)

where $X^1$ and $X^2$, $L^1$ and $L^2$, n, n' and $R^{25}$-$R^{39}$ have the meanings given for the general formulae (N2a) and (N2b).

The ruthenium- or osmium-carbene catalysts according to the invention are typically pentacoordinated.

In the Structural Element of the General Formula (N1), $R^{15}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, preferably $C_1$-$C_{20}$-alkyl, in particular $C_1$-$C_6$-alkyl, cycloalkyl, preferably $C_3$-$C_{20}$-cycloalkyl, in particular $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, in particular phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, alkylsulphinyl, preferably $C_1$-$C_{20}$-alkylsulphinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, where these radicals may all optionally be substituted by one or more alkyl, halogen, alkoxy, aryl or heteroaryl radicals, or alternatively two directly adjacent radicals from the group consisting of $R^{25}$-$R^{32}$ can also be bridged with inclusion of the ring carbons to which they are bound to form a cyclic group, preferably an aromatic system, or alternatively $R^{32}$ may be bridged with another ligand of the ruthenium- or osmium-carbene complex catalyst, m is 0 or 1 and A is oxygen, sulphur, C($R^{33}$)($R^{34}$), N—$R^{35}$, —C($R^{36}$)=C($R^{37}$)— or —C($R^{36}$)($R^{38}$)—C($R^{37}$)($R^{39}$)—, where $R^{33}$-$R^{39}$ are identical or different and can each have the same preferred meanings as the radicals $R^{25}$-$R^{32}$.

$C_1$-$C_6$-alkyl in the structural element of the general formula (N1) is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-cycloalkyl in the structural element of the general formula (N1) is, for example, cyclopropyl, cyclobutyl, cyclopentyl, cyclohexyl, cycloheptyl or cyclooctyl.

$C_6$-$C_{24}$-aryl in the structural element of the general formula (N1) is an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl and anthracenyl.

The radicals $X^1$ and $X^2$ in the structural element of the general formula (N1) have the same general, preferred and particularly preferred meanings given for catalysts of the general formula A.

In the general formulae (N2a) and (N2b) and analogously in the general formulae (N10a) and (N10b), the radicals $L^1$ and $L^2$ are identical or different ligands, preferably uncharged electron donors, and can have the same general, preferred and particularly preferred meanings given for the catalysts of the general formula A.

Preference is given to using catalysts of the general formulae (N2a) and (N2b) having a general structural unit (N1) in which M is ruthenium, $X^1$ and $X^2$ are both halogen, n is 0, 1 or 2 in the general formula (N2a) or n' is 1 in the general formula (N2b), $L^1$ and $L^2$ are identical or different and have the general or preferred meanings given for the general formulae (N2a) and (N2b), $R^{25}$-$R^{32}$ are identical or different and have the general or preferred meanings given for the general formulae (N2a) and (N2b), m is either 0 or 1 and, when m=1

A is oxygen, sulphur, C($C_1$-$C_{10}$-alkyl)$_2$, —C($C_1$-$C_{10}$-alkyl)$_2$-C($C_1$-$C_{10}$-alkyl)$_2$-, —C($C_1$-$C_{10}$-alkyl)=C($C_1$-$C_{10}$-alkyl)- or N($C_1$-$C_{10}$-alkyl).

Very particular preference is given to using catalysts of the formulae (N2a) or (N2b) having a general structural unit (N1) in which M is ruthenium, $X^1$ and $X^2$ are both chlorine, n is 0, 1 or 2 in the general formula (N2a) or n' is 1 in the general formula (N2b), $L^1$ is an imidazolidine radical of one of the formulae (IIIa) to (IIIf), $L^2$ is a sulphonated phosphine, phosphate, phosphinite, phosphonite, arsine, stibine, ether, amine, amide, sulphoxide, carboxyl, nitrosyl, pyridine radical, an imidazolidine radical of one of the formulae (XIIa) to (XIIf) or a phosphine ligand, in particular $PPh_3$, $P(p\text{-tol})_3$, $P(o\text{-tol})_3$, $PPh(CH_3)_2$, $P(CF_3)_3$, $P(p\text{-FC}_6H_4)_3$, $P(p\text{-CF}_3C_6H_4)_3$, $P(C_6H_4\text{—}SO_3Na)_3$, $P(CH_2C_6H_4\text{—}SO_3Na)_3$, $P(\text{isopropyl})_3$, $P(CHCH_3(CH_2CH_3))_3$, $P(\text{cyclopentyl})_3$, $P(\text{cyclohexyl})_3$, $P(\text{neopentyl})_3$ and $P(\text{neophenyl})_3$, $R^{25}$-$R^{32}$ have the general or preferred meanings given for the general formulae (N2a) and (N2b), m is either 0 or 1 and, when m=1,

A is oxygen, sulphur, $C(C_1\text{-}C_{10}\text{-alkyl})_2$, —$C(C_1\text{-}C_{10}\text{-alkyl})_2$, —$C(C_1\text{-}C_{10}\text{-alkyl})_2$-, —$C(C_1\text{-}C_{10}\text{-alkyl})$=$C(C_1\text{-}C_{10}\text{-alkyl})$- or $N(C_1\text{-}C_{10}\text{-alkyl})$.

If the radical $R^{25}$ is bridged with another ligand of the catalyst of the formula N, this results, for example, in the case of the catalysts of the general formulae (N2a) and (N2b) in the following structures of the general formulae (N13a) and (N13b)

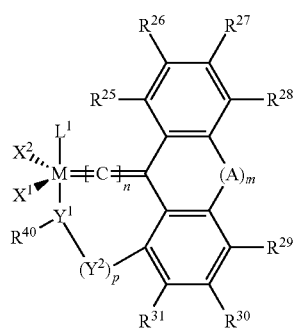

(N13a)

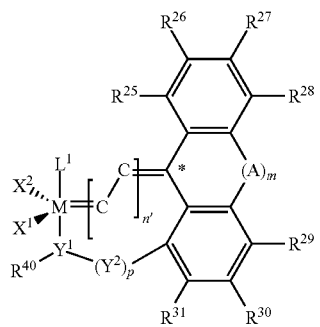

(N13b)

where $Y^1$ is oxygen, sulphur, an N—$R^{41}$ radical or a P—$R^{41}$ radical, where $R^{4I}$ has the following meanings, $R^{40}$ and $R^{41}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all optionally be substituted by one or more alkyl, halogen, alkoxy, aryl or heteroaryl radicals, p is 0 or 1 and $Y^2$ where p=1 is, —$(CH_2)_r$— where r=1, 2 or 3, —C(=O)—$CH_2$—, —C(=O)—, —N=CH—, —N(H)—C(=O)— or alternatively the total structural unit "—$Y^1$ ($R^{40}$)—$(Y^2)_p$—" is (—$N(R^{40})$=CH—$CH_2$—), (—$N(R^{40},R^{41})$=CH—$CH_2$—) and where M, $X^1$, $X^2$, $L^1$, $R^{25}$-$R^{32}$, A, m and n have the same meanings as in the general formulae (IIa) and (IIb).

Preferred catalyst systems contain a compound of the general formula (Z) in which the $BF_mX_n$ moiety is $BF_3$, $BF_2O$, $BFCl_2$, $BF_2Br$, $BFBr_2$, $BF_2(OC_2H_5)$, $BF(OC_2H_5)_2$, $BF_2(CH_3)$ and $BF(CH_3)_2$, D is selected from the group consisting of water, diethyl ether, ethylamine, THF, n-propanol, formic acid, acetic acid, trifluoroacetic acid, trichloroacetic acid, sulphuric acid, phosphoric acid, trifluoromethanesulphonic acid and toluenesulphonic acid and v=1, 2, 3, 4 or 5, particularly preferably 1, 2 or 3, together with a catalyst of the formula (N) having one of the structures shown below.

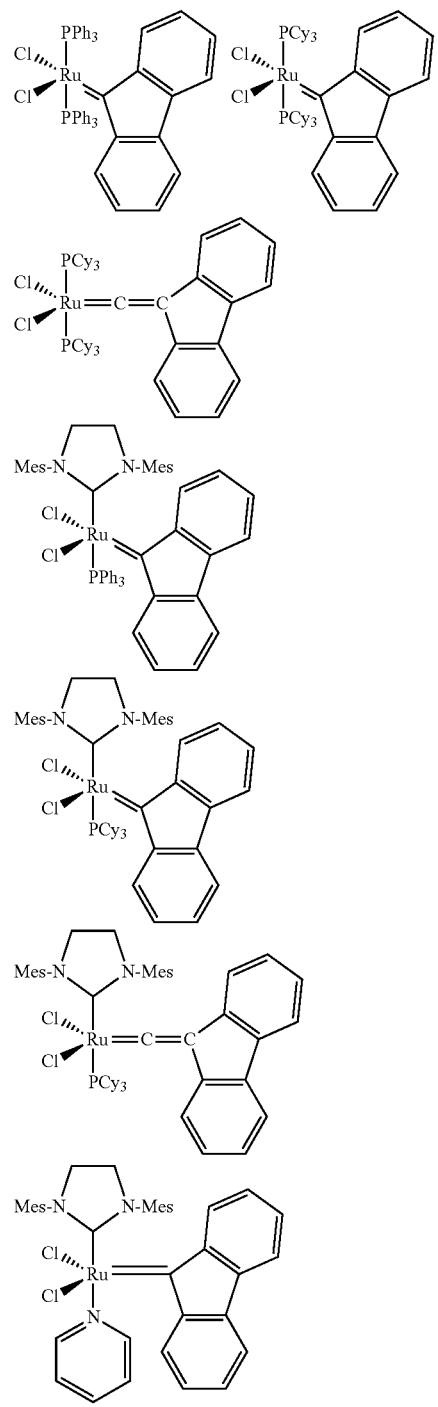

-continued
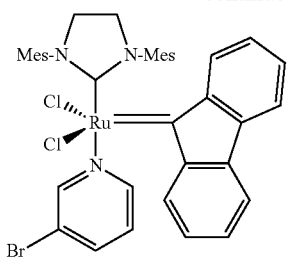
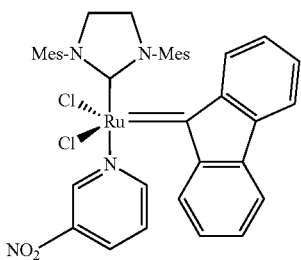
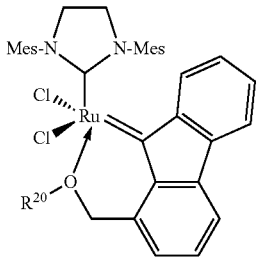
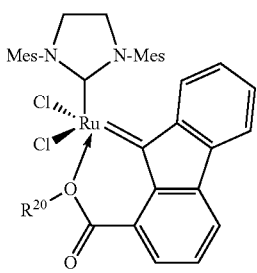
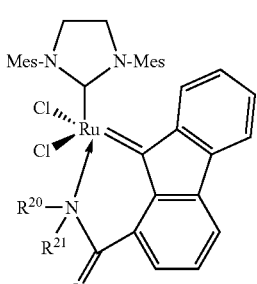
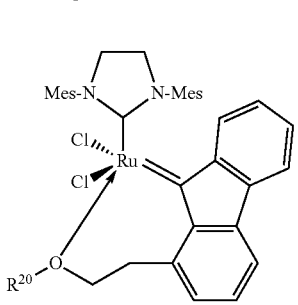
-continued
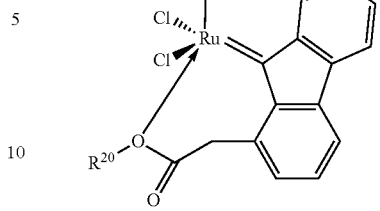
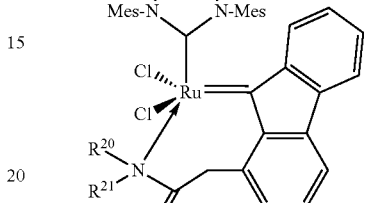
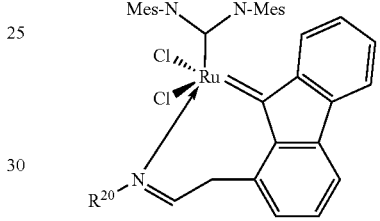
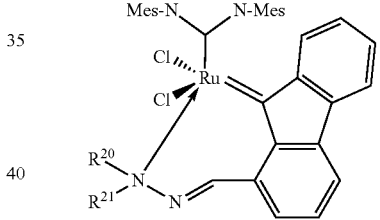
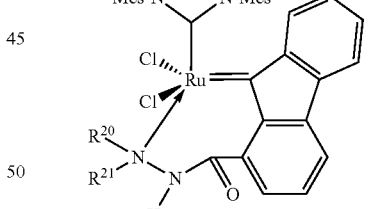
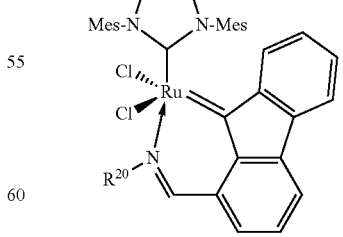
Catalysts (N) can be prepared by reaction of suitable catalyst precursor complexes with suitable diazo compounds when this synthesis is carried out in a specific temperature range and at the same time the molar ratio of the starting materials is in a selected range. For this purpose, a catalyst precursor compound is, for example, reacted with a compound of the general formula (N1-Azo)

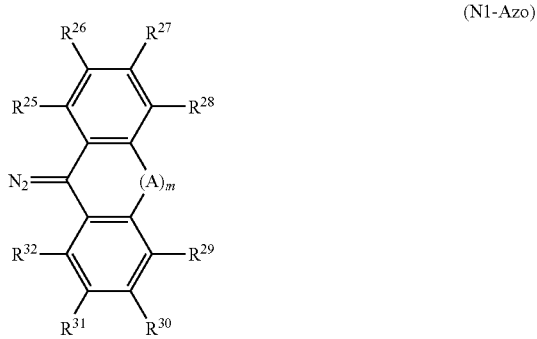

(N1-Azo)

where $R^{25}$-$R^{32}$, m and A have the meanings given for the general formula (NI), with this reaction being carried out
(i) at a temperature in the range from −20° C. to 100° C., preferably in the range from +10° C. to +80° C., particularly preferably in the range from +30 to +50° C., and
(ii) at a molar ratio of the catalyst precursor compound to the compound of the general formula (N-1-Azo) of from 1:0.5 to 1:5, preferably from 1:1.5 to 1:2.5, particularly preferably 1:2.

The compounds of the general formula (N1-Azo) are 9-diazofluorene or various derivatives thereof depending on the meanings of the radicals $R^{25}$-$R^{32}$ and A. It is possible to use a variety of derivatives of 9-diazofluorene. In this way, a wide variety of fluorenylidene derivatives can be obtained.

The catalyst precursor compounds are ruthenium or osmium complex catalysts which do not yet contain any ligand having the general structural element (N1).

In this reaction, a ligand leaves the catalyst precursor compound and a carbene ligand containing the general structural element (N1) is taken up.

The reaction can be carried out using saturated, unsaturated and aromatic hydrocarbons, ethers and halogenated solvents. Preference is given to chlorinated solvents such as dichloromethane, 1,2-dichloroethane or chlorobenzene. The catalyst precursor compound in the form of the ruthenium or osmium precursor is usually initially charged in a preferably dried solvent. The concentration of the ruthenium or osmium precursor in the solvent is usually in the range from 15 to 25% by weight, preferably in the range from 50 to 20% by weight. The solution can subsequently be heated. It has been found to be particularly useful to heat the solution to a temperature in the range from 30 to 50° C. The compound of the general formula (N-1-Azo) in a usually dried, preferably water-free solvent is then added. The concentration of the compound of the general formula (N1-Azo) in the solvent is preferably in the range from 5 to 15% by weight, preferably about 10%. To complete the reaction, the mixture is allowed to react further for from 0.5 h to 1.5 h at a temperature which is particularly preferably in the same range as mentioned above, i.e. from 30 to 50° C. The solvent is subsequently removed and the residue is purified by extraction, for example with a mixture of hexane with an aromatic solvent.

The catalyst according to the invention is usually not obtained in pure form but in an equimolar, determined by the stochiometry of the reaction, mixture with the reaction product of the compound of the general formula (N1-Azo) with the leaving ligand of the catalyst precursor compound used in the reaction. The leaving ligand is preferably a phosphine ligand. This reaction product can be removed in order to obtain the pure catalyst according to the invention. However, metathesis reactions can be catalysed using not only the pure catalyst according to the invention but also the mixture of this catalyst according to the invention with the abovementioned reaction product.

The above-described process is described in more detail below:

In the case of the catalysts of the general formulae (N2a) and (N2b), a catalyst precursor compound of the general formula ("N2 precursor"),

(N2 precursor)

where
M, $X^1$, $X^2$, $L^1$ and $L^2$ have the same general and preferred meanings as in the general formulae (N2a) and (N2b) and
LL is a "leaving ligand" and can have the same meanings as $L^1$ and $L^2$ in the general formulae (N2a) and (N2b), preferably a phosphine ligand having one of the meanings given for the general formulae (N2a) and (N2b),
is reacted with a compound of the general formula (N1-Azo) at a temperature in the range from −20° C. to 100° C., preferably in the range from +10° C. to +80° C., particularly preferably in the range from +30 to +50° C., and at a molar ratio of the catalyst precursor compound of the general formula (XVII) to the compound of the general formula (N1-Azo) of from 1:0.5 to 1:5, preferably from 1:1.5 to 1:2.5, particularly preferably 1:2. Further examples of the preparation of such catalysts of the formula (N) are given in the as yet unpublished patent application DE 102007039695.

In the catalyst system to be used according to the invention, the metathesis catalyst and the compound of the general formula (Z) are used in a molar ratio of [metathesis catalyst: compound of the general formula (Z)]=1:(0.1-1000), preferably 1:(0.5-100) and particularly preferably 1: (1-50).

In the use according to the invention of the catalyst system in the metathesis reaction of nitrile rubbers, the compound of the general formula (Z) can be added in a solvent or dispersion medium or without solvent or dispersion medium to the complex catalyst or its solution in order to obtain the catalyst system according to the invention.

As solvent or dispersion medium in which the compound of the general formula (Z) is added to the complex catalyst or its solution, it is possible to use all known solvents or dispersion media. For the addition of the compound of the general formula (Z) to be effective, it is not necessary for the compound of the general formula (Z) to be soluble in the dispersion medium. Preferred solvents or dispersion media include, but are not restricted to, acetone, benzene, chlorobenzene, chloroform, cyclohexane, dichloromethane, diethyl ether, dioxane, dimethylformamide, dimethylacetamide, dimethylsulphone, dimethyl sulphoxide, methyl ethyl ketone, tetrahydrofuran, tetrahydropyran and toluene. The solvent or dispersion medium is preferably inert towards the complex catalyst.

The abovementioned catalyst systems are, according to the invention, used for the metathesis of nitrile rubber. Their use according to the invention is then a process for reducing the molecular weight of the nitrile rubber by bringing the nitrile rubber into contact with the catalyst system of the invention. This reaction is a cross-metathesis.

In the use according to the invention of the catalyst systems for the metathesis of nitrile rubber, the amount in which the compound of the general formula (Z) is used, based on the nitrile rubber to be degraded, is in the range from 0.0001 phr to 5 phr, preferably from 0.001 phr to 2 phr (phr=parts by weight per 100 parts by weight of rubber).

For use in the NBR metathesis, too, the compound of the general formula (Z) can be added in a solvent or dispersion medium or without solvent or dispersion medium to a solution of the complex catalyst. As an alternative, the compound of the general formula (Z) can also be added directly to a solution of the nitrile rubber to be degraded to which the complex catalyst is also added, so that the entire catalyst system according to the invention is present in the reaction mixture.

The amount of complex catalyst based on the nitrile rubber used depends on the nature and the catalytic activity of the specific complex catalyst. The amount of complex catalyst used is usually from 1 to 1000 ppm of noble metal, preferably from 2 to 500 ppm, in particular from 5 to 250 ppm, based on the nitrile rubber used.

The NBR metathesis can be carried out in the absence or presence of a coolefin. This coolefin is preferably a straight-chain or branched $C_2$-$C_{16}$-olefin. Suitable coolefins are, for example, ethylene, propylene, isobutene, styrene, 1-hexene and 1-octene. Preference is given to using 1-hexene or 1-octene. If the coolefin is liquid (as in the case of, for example, 1-hexene), the amount of coolefin is preferably in the range 0.2-20% by weight, based on the nitrile rubber used. If the coolefin is a gas, as in the case of, for example, ethylene, the amount of coolefin is selected so that a pressure in the range $1 \times 10^5$ Pa-$1 \times 10^7$ Pa, preferably a pressure in the range from $5.2 \times 10^5$ Pa to $4 \times 10^6$ Pa, is established in the reaction vessel at room temperature.

The metathesis reaction can be carried out in a suitable solvent which does not deactive the catalyst used and also does not have an adverse effect on the reaction in any other way. Preferred solvents include, but are not restricted to, dichloromethane, benzene, toluene, methyl ethyl ketone, acetone, tetrahydrofuran, tetrahydropyran, dioxane, cyclohexane and chlorobenzene. The particularly preferred solvent is chlorobenzene. In some cases when the coolefin itself can function as solvent, e.g. in the case of 1-hexene, the addition of a further additional solvent can be dispensed with.

The concentration of the nitrile rubber used in the reaction mixture of the metathesis is not critical, but it should naturally be ensured that the reaction is not adversely affected by an excessively high viscosity of the reaction mixture and the associated mixing problems. The concentration of NBR in the reaction mixture is preferably in the range from 1 to 25% by weight, particularly preferably in the range from 5 to 20% by weight, based on the total reaction mixture.

The metathetic degradation is usually carried out at a temperature in the range from 10° C. to 150° C., preferably at a temperature in the range from 20 to 100° C.

The reaction time depends on a number of factors, for example on the type of NBR, the type of catalyst, the catalyst concentration used and the reaction temperature. The reaction is typically complete within five hours under normal conditions. The progress of the metathesis can be monitored by standard analytical methods, e.g. by GPC measurements or by determination of the viscosity.

As nitrile rubbers ("NBR"), it is possible to use copolymers or terpolymers which contain repeating units of at least one conjugated diene, at least one a,β-unsaturated nitrile and, if appropriate, one or more further copolymerizable monomers in the metathesis reaction.

The conjugated diene can be of any nature. Preference is given to using ($C_4$-$C_6$)-conjugated dienes. Particular preference is given to 1,3-butadiene, isoprene, 2,3-dimethylbutadiene, piperylene or mixtures thereof. In particular, use is made of 1,3-butadiene or isoprene or mixtures thereof. Very particular preference is given to 1,3-butadiene.

As α,β-unsaturated nitrile, it is possible to use any known α,β-unsaturated nitrile, with preference being given to ($C_3$-$C_5$)-α,β-unsaturated nitriles such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

In addition to the conjugated diene and the 4-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl(meth) acrylate, ethoxyethyl(meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of the 4-unsaturated nitrile or the sum of α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrite rubbers by polymerization of the abovementioned monomers is adequately known to those skilled in the art and is comprehensively described in the literature.

Nitrile rubbers which can be used for the purposes of the invention are also commercially available, e.g. as products from the product range of the Perbunan® and Krynac® grades of Lanxess Deutschland GmbH.

The nitrile rubbers used for the metathesis have a Mooney viscosity (ML 1+4 at 100° C.) in the range from 30 to 70, preferably from 30 to 50. This corresponds to a weight average molecular weight $M_w$ in the range 150 000-500 000, preferably in the range 180 000-400 000. Furthermore, the nitrile rubbers used have a polydispersity PDI=$M_w/M_n$, where $M_w$ is the weight average molecular weight and $M_n$ is the number average molecular weight, in the range 2.0-6.0 and preferably in the range 2.0-4.0.

The determination of the Mooney viscosity is carried out n accordance with ASTM Standard D 1646.

The nitrile rubbers obtained by the metathesis process of the invention have a Mooney viscosity (ML 1+4 at 100° C.) in the range 5-30, preferably in the range 5-20. This corresponds to a weight average molecular weight M$_w$ in the range 10 000-100 000, preferably in the range 10 000-80 000. Furthermore, the nitrile rubbers obtained have a polydispersity PDI=M$_w$/M$_n$, where M$_n$ is the number average molecular weight and M$_w$ is the weight average molecular weight, in the range 1.4-4.0, preferably in the range 1.5-3.0.

The metathetic degradation in the presence of the catalyst system of the invention can be followed by a hydration of the degraded nitrile rubbers obtained. This can be carried out in a manner known to those skilled in the art.

The hydration can be carried out using homogeneous or heterogeneous hydration catalysts. It is also possible to carry out the hydration in situ, i.e. in the same reaction mixture in which the metathetic degradation has previously taken place and without the need to isolate the degraded nitrile rubber. The hydration catalyst is simply introduced into the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydration in the homogeneous phase are described below and are also known from DE-A-25 39 132 and EP-A-0 471 250.

The selective hydration can, for example, be achieved in the presence of a rhodium- or ruthenium-containing catalyst. It is possible to use, for example, a catalyst of the general formula

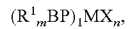
$(R^1{}_mBP)_lMX_n$, where M is ruthenium or rhodium is, the radicals R$^1$ are identical or different and are each a C$_1$-C$_8$-alkyl group, a C$_4$-C$_8$-cycloalkyl group, a C$_6$-C$_{15}$-aryl group or a C$_7$-C$_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethylsulphoxide)rhodium(III) chloride and also tetrakis(triphenylphosphine)rhodium hydride of the formula (C$_6$H$_5$)$_3$P)$_4$RhH and the corresponding compounds in which all or part of the triphenylphosphine has been replaced by tricyclohexylphosphine. The catalyst can be used in small amounts. An amount in the range 0.01-1% by weight, preferably in the range 0.03 to 0.5% by weight and particularly preferably in the range 0.1-0.3% by weight, based on the weight of the polymer, is suitable.

It is usually useful to use the catalyst together with a cocatalyst which is a ligand of the formula R$^1{}_m$B, where R$^1$, m and B have the meanings given above for the catalyst. Preference is given to m being 3, B being phosphorus and the radicals R$^1$ can be identical or different. The cocatalysts preferably have trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicyclalkylmonoaryl radicals.

Examples of cocatalysts may be found, for example, in U.S. Pat. No. 4,631,315. A preferred cocatalyst is triphenylphosphine. The cocatalyst is preferably used in amounts in the range 0.1-5% by weight, preferably in the range 0.3-4% by weight, based on the weight of the nitrile rubber to be hydrated. Furthermore, the weight ratio of the rhodium-containing catalyst to the cocatalyst is preferably in the range from 1:3 to 1:55, particularly preferably in the range from 1:5 to 1:45. Based on 100 parts by weight of the nitrile rubber to be hydrated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst.

The practical procedure for carrying out this hydration is adequately known to those skilled in the art from U.S. Pat. No. 6,683,136. The nitrile rubber to be hydrated is usually treated in a solvent such as toluene or monochlorobenzene with hydrogen at a temperature in the range from 100 to 150° C. and a pressure in the range from 50 to 150 bar for from 2 to 10 hours.

For the purposes of the present invention, hydration is a reaction of at least 50%, preferably 70-100%, particularly preferably 80-100%, of the double bonds present in the starting nitrile rubber. Residual contents of double bonds in HNBR of from 0 to 8% are also particularly preferred.

When heterogeneous catalysts are used, these are usually supported catalysts based on palladium which are supported, for example, on carbon, silica, calcium carbonate or barium sulphate.

After the hydration is complete, a hydrated nitrile rubber having a Mooney viscosity (ML 1+4 at 100° C.), measured in accordance with ASTM Standard D 1646, in the range 1-50 is obtained. This corresponds approximately to a weight average molecular weight M$_w$ in the range 2000-400 000 g/mol. The Mooney viscosity (ML 1+4 at 100° C.) is preferably in the range from 5 to 30. This corresponds approximately to a weight average molecular weight M$_w$ in the range of about 20 000-200 000. Furthermore, the hydrated nitrile rubbers obtained have a polydispersity PDI=M$_w$/M$_n$, where M$_w$ is the weight average molecular weight and M$_n$ is the number average molecular weight, in the range 1-5 and preferably in the range 1.5-3.

However, the catalyst system cannot only be used successfully for the metathetic degradation of nitrile rubbers but can also be used universally for other metathesis reactions. In a process for ring-closing metathesis, the catalyst system of the invention is brought into contact with the appropriate acyclic starting material, e.g. diethyl diallylmalonate.

The use according to the invention of the catalyst systems comprising metathesis catalyst and the fluorine-containing boron compound of the general formula (Z) allows, at comparable reaction times, the amount of the actual metathesis catalyst and thus the amount of noble metal to be significantly reduced compared to analogous metathesis reactions in which only the catalyst is used, i.e. without addition of a fluorine-containing boron compound of the general formula (Z). When comparable noble metal contents are used, the reaction time is substantially shortened by the addition of the fluorine-containing boron compound of the general formula (Z). When used for the degradation of nitrile rubbers, degraded nitrile rubbers having significantly lower molecular weights $M_w$ and $M_n$ can be achieved.

EXAMPLES

When the following examples are carried out at room temperature, this is 22+/−2° C. In the examples below, the complex catalysts shown in Table 1 were used.

TABLE 1

| Name of catalyst | Structural formula | Molecular weight [g/mol] | Source |
|---|---|---|---|
| Grubbs II Catalyst | | 848.33 | Materia/ Pasadena; USA |
| Hoveyda Catalyst | | 626.14 | Aldrich |
| Grela Catalyst | | 671.13 | Prepared as described in J. Org. Chem. 2004, 69, 6894-6896 |

The following examples according to the invention were carried out using the compounds of the general formula (Z) shown in Table 2.

TABLE 2

| Name of additive | Formula | Source |
|---|---|---|
| Diethyl ether adduct of boron trifluoride | $BF_3{*}C_4H_{10}O$ | Acros Organics |
| Ethylamine adduct of boron trifluoride | $BF_3{*}EtNH_2$ | Aldrich |
| Tetrahydrofuran adduct of boron trifluoride | $BF_3{*}C_4H_8O$ | Aldrich |
| n-Propanol adduct of boron trifluoride | $BF_3{*}C_3H_7OH$ | Aldrich |
| Acetic acid adduct of boron trifluoride | $BF_3{*}CH_3COOH$ | Aldrich |

The examples carried out on the metathetic degradation of nitrile rubber are summarized in terms of the complex catalysts used, the compound of the general formula (Z) and the molar ratio of complex catalyst:additive used in Table 3 below.

TABLE 3

| Experiment | Catalyst | Additive | Molar ratio of catalyst:additive |
|---|---|---|---|
| 1.0 not according to the invention | Grubbs II | — | — |

TABLE 3-continued

| Experiment | Catalyst | Additive | Molar ratio of catalyst:additive |
|---|---|---|---|
| 1.1 according to the invention | Grubbs II | $BF_3{*}Et_2O$ | 1:22 |
| 1.2 according to the invention | Grubbs II | $BF_3{*}Et_2O$ | 1:5 |
| 1.3 according to the invention | Grubbs II | $BF_3{*}Et_2O$ | 1:2 |
| 1.4 according to the invention | Grubbs II | $BF_3{*}Et_2O$ | 1:1 |
| 1.5 according to the invention | Grubbs II | $BF_3{*}EtNH_2$ | 1:22 |
| 1.6 according to the invention | Grubbs II | $BF_3{*}THF$ | 1:22 |
| 1.7 according to the invention | Grubbs II | $BF_3{*}$n-Propanol | 1:22 |
| 1.8 according to the invention | Grubbs II | $BF_3{*}CH_3COOH$ | 1:22 |
| 2.0 not according to the invention | Grela | — | — |
| 2.1 according to the invention | Grela | $BF_3{*}Et_2O$ | 1:22 |

Nitrile Rubber Used:

The degradation reactions described in the following examples were carried out using the nitrile rubber Perbunan® 3436 F from Lanxess Deutschland GmbH.

This nitrile rubber had the following characteristic properties:

| | |
|---|---|
| Acrylonitrile content: | 34.3% by weight |
| Mooney Viscosity (ML 1 + 4 at 100° C.): | 33 Mooney units |
| Residual moisture content: | 1.0% by weight |
| $M_w$: | 211 kg/mol |
| $M_n$: | 82 kg/mol |
| PDI ($M_w/M_n$): | 2.6 |

Procedure for the Metathesis of the Nitrile Rubber:

The metathetic degradation was in each case carried out using 293.3 g of chlorobenzene (hereinafter referred to as "MCB"/Aldrich), which was distilled and made inert at room temperature by passing argon through it before use. To carry out the degradation, 40 g of NBR were dissolved over a period of 12 hours while stirring at room temperature. In each case, 0.8 g (2 phr) of 1-hexene and then the boron compounds indicated in the tables (dissolved in 10 g of MCB which had been made inert) were added to the NBR-containing solution and the mixture was homogenized by stirring for 30 minutes.

The Ru catalysts (Grubbs II, Hoveyda and Grela catalyst) were in each case dissolved under argon in 10 g of MCB which had been made inert, with the addition of the catalyst solutions to the NBR solutions in MCB being carried out immediately after the preparation of the catalyst solutions.

The metathesis reactions were carried out at room temperature using the amounts of starting materials indicated in the following tables.

After the reaction times indicated in the tables, about 3 ml were in each case taken from the reaction solutions and the reaction was stopped by immediate addition of about 0.2 ml of ethyl vinyl ether. 0.2 ml was taken from the stopped solution and diluted with 3 ml of DMAc (N,N-dimethylacetamide (stabilized with LiBr 0.075M; from Aldrich)).

To carry out the GPC analysis, the solutions were in each case filtered by means of a 0.2 µm Teflon syringe filter (Chromafil PTFE 0.2 mm; from Machery-Nagel). The GPC analysis was subsequently carried out using an instrument from Waters (Mod. 510). A combination of a precolumn (PL Guard from Polymer Laboratories) with two Resipore columns (300×7.5 mm, pore size: 3 µm) from Polymer Laboratories was used for the analysis. The columns were calibrated using linear polystyrene having molar masses from 960 to 6×10$^5$ g/mol from Polymer Standards Services. An RI detector from Waters (Waters 410 Differential Refractometer) was used as detector. The analysis was carried out at a flow rate of 1.0 ml/min at 80° C. using N,N'-dimethylacetamide as eluent. The evaluation of the GPC curves was carried out using software from Polymer Laboratories (Cirrus Multi Version 3.0).

Series 1

Use of the Grubbs II catalyst in combination with various fluorine-containing boron compounds in the metathetic degradation of NBR Experiment 1.0

Use of the Grubbs II catalyst without additive (not according to the invention)

| NBR Amount [g] | Grubbs II catalyst | | 1-Hexene | | Additive | |
|---|---|---|---|---|---|---|
| | Amount [mg] | Based on NBR [phr] | Amount [g] | Based on NBR [phr] | Type | Amount [mg] |
| 40 | 20 | 0.05 | 0.8 | 2.0 | — | — |

| Time [min.] | $M_w$ [kg/mol] | $M_n$ [kg/mol] | PDI |
|---|---|---|---|
| 0 | 211 | 82 | 2.6 |
| 30 | 139 | 66 | 2.1 |
| 60 | 101 | 54 | 1.9 |
| 185 | 77 | 45 | 1.7 |
| 425 | 62 | 37 | 1.7 |

Experiment 1.1

Use of the Grubbs II catalyst in combination with $BF_3*Et_2O$ at a molar ratio of Grubbs II/$BF_3*Et_2O$=1:22 (according to the invention)

| NBR Amount [g] | Grubbs II catalyst | | 1-Hexene | | Additive | |
|---|---|---|---|---|---|---|
| | Amount [mg] | Based on NBR [phr] | Amount [g] | Based on NBR [phr] | Type | Amount [mg] |
| 40 | 20 | 0.05 | 0.8 | 2.0 | $BF_3*Et_2O$ | 74 |

| Time [min.] | $M_w$ [kg/mol] | $M_n$ [kg/mol] | PDI |
|---|---|---|---|
| 0 | 211 | 82 | 2.6 |
| 30 | 16 | 7 | 2.3 |
| 60 | 10 | 6 | 1.7 |
| 185 | 11 | 6 | 1.8 |
| 425 | 10 | 6 | 1.7 |

Experiment 1.2

Use of the Grubbs II catalyst in combination with $BF_3*Et_2O$ at a molar ratio of Grubbs II/$BF_3*Et_2O$=1:5 (according to the invention)

| NBR Amount [g] | Grubbs II catalyst | | 1-Hexene | | Additive | |
|---|---|---|---|---|---|---|
| | Amount [mg] | Based on NBR [phr] | Amount [g] | Based on NBR [phr] | Type | Amount [mg] |
| 40 | 20 | 0.05 | 0.8 | 2.0 | $BF_3*Et_2O$ | 16.7 |

| Time [min.] | $M_w$ [kg/mol] | $M_n$ [kg/mol] | PDI |
|---|---|---|---|
| 0 | 211 | 82 | 2.6 |
| 30 | 115 | 53 | 2.2 |

-continued

| | | | |
|---|---|---|---|
| 60 | 72 | 36 | 2.0 |
| 185 | 48 | 26 | 1.8 |
| 425 | 34 | 18 | 1.9 |

Experiment 1.3

Use of the Grubbs II catalyst in combination with $BF_3*Et_2O$ at a molar ratio of Grubbs II/$BF_3*Et_2O$=1:2 (according to the invention)

| NBR | Grubbs II catalyst | | 1-Hexene | | Additive | |
|---|---|---|---|---|---|---|
| | Based on | | Based on | | | |
| Amount [g] | Amount [mg] | NBR [phr] | Amount [g] | NBR [phr] | Type | Amount [mg] |
| 40 | 20 | 0.05 | 0.8 | 2.0 | $BF_3*Et_2O$ | 7 |

| Time [min.] | $M_w$ [kg/mol] | $M_n$ [kg/mol] | PDI |
|---|---|---|---|
| 0 | 211 | 82 | 2.6 |
| 30 | 129 | 63 | 2.0 |
| 60 | 92 | 51 | 1.8 |
| 185 | 42 | 20 | 2.1 |
| 425 | 35 | 18 | 1.9 |

Experiment 1.4

Use of the Grubbs II catalyst in combination with $BF_3*Et_2O$ at a molar ratio of Grubbs II/$BF_3*Et_2O$=1:1 (according to the invention)

| NBR | Grubbs II catalyst | | 1-Hexene | | Additive | |
|---|---|---|---|---|---|---|
| | Based on | | Based on | | | |
| Amount [g] | Amount [mg] | NBR [phr] | Amount [g] | NBR [phr] | Type | Amount [mg] |
| 40 | 20 | 0.05 | 0.8 | 2.0 | $BF_3*Et_2O$ | 3.4 |

| Time [min.] | $M_w$ [kg/mol] | $M_n$ [kg/mol] | PDI |
|---|---|---|---|
| 0 | 211 | 82 | 2.6 |
| 30 | 136 | 63 | 2.2 |
| 60 | 99 | 53 | 1.9 |
| 185 | 77 | 37 | 2.1 |
| 425 | 59 | 30 | 2.0 |

Experiment 1.5

Use of the Grubbs II catalyst in combination with $BF_3*EtNH_2$ at a molar ratio of Grubbs II/$BF_3*EtNH_2$=1:22 (according to the invention)

| NBR | Grubbs II catalyst | | 1-Hexene | | Additive | |
|---|---|---|---|---|---|---|
| | Based on | | Based on | | | |
| Amount [g] | Amount [mg] | NBR [phr] | Amount [g] | NBR [phr] | Type | Amount [mg] |
| 40 | 20 | 0.05 | 0.8 | 2.0 | $BF_3*EtNH_2$ | 59 |

| Time [min.] | $M_w$ [kg/mol] | $M_n$ [kg/mol] | PDI |
|---|---|---|---|
| 0 | 211 | 82 | 2.6 |
| 30 | 110 | 49 | 2.2 |
| 60 | 86 | 41 | 2.1 |
| 185 | 71 | 34 | 2.1 |
| 425 | — | — | — |

Experiment 1.6

Use of the Grubbs II catalyst in combination with $BF_3*THF$ at a molar ratio of Grubbs II/$BF_3*THF$=1:22 (according to the invention)

| NBR | Grubbs II catalyst | | 1-Hexene | | Additive | |
|---|---|---|---|---|---|---|
| | Based on | | Based on | | | |
| Amount [g] | Amount [mg] | NBR [phr] | Amount [g] | NBR [phr] | Type | Amount [mg] |
| 40 | 20 | 0.05 | 0.8 | 2.0 | $BF_3*THF$ | 73 |

| Time [min.] | $M_w$ [kg/mol] | $M_n$ [kg/mol] | PDI |
|---|---|---|---|
| 0 | 211 | 82 | 2.6 |
| 30 | 112 | 54 | 2.1 |
| 60 | — | — | — |
| 185 | — | — | — |
| 425 | — | — | — |

Experiment 1.7

Use of the Grubbs II catalyst in combination with $BF_3*$n-propanol at a molar ratio of Grubbs II/$BF_3*$n-propanol=1:22 (according to the invention)

| NBR | Grubbs II catalyst | | 1-Hexene | | Additive | |
|---|---|---|---|---|---|---|
| | Based on | | Based on | | | |
| Amount [g] | Amount [mg] | NBR [phr] | Amount [g] | NBR [phr] | Type | Amount [mg] |
| 40 | 20 | 0.05 | 0.8 | 2.0 | $BF_3*$n-propanol | 66 |

| Time [min.] | $M_w$ [kg/mol] | $M_n$ [kg/mol] | PDI |
|---|---|---|---|
| 0 | 211 | 82 | 2.6 |
| 30 | 87 | 44 | 2.0 |

-continued

| | | | |
|---|---|---|---|
| 60 | 64 | 31 | 2.1 |
| 185 | 32 | 17 | 1.9 |
| 425 | 24 | 14 | 1.7 |

-continued

| | | | |
|---|---|---|---|
| 185 | 48 | 29 | 1.6 |
| 425 | 50 | 29 | 1.7 |

Experiment 1.8

Use of the Grubbs II catalyst in combination with $BF_3*CH_3COOH$ at a molar ratio of Grubbs II/$BF_3*CH_3COOH$=1:22 (according to the invention)

| NBR Amount [g] | Grubbs II catalyst | | 1-Hexene | | Additive | |
|---|---|---|---|---|---|---|
| | Amount [mg] | Based on NBR [phr] | Amount [g] | Based on NBR [phr] | Type | Amount [mg] |
| 40 | 20 | 0.05 | 0.8 | 2.0 | $BF_3*CH_3COOH$ | 98 |

| Time [min.] | $M_w$ [kg/mol] | $M_n$ [kg/mol] | PDI |
|---|---|---|---|
| 0 | 211 | 82 | 2.6 |
| 30 | 99 | 50 | 2.0 |
| 60 | — | — | — |
| 185 | — | — | — |
| 425 | — | — | — |

In Series 1, it is shown that when using the Grubbs II catalyst, the metathetic degradation of nitrile rubber is accelerated by addition of compounds of the $BF_3*D$ type; i.e. after the same reaction times, $M_w$, and $M_n$ are significantly lower than in the reference experiment (experiment 1.0) which was carried out without additives. In addition, it is shown that the effect according to the invention occurs at different molar ratios of Grubbs II catalyst: $BF_3*D$.

Series 2

Use of the Grela catalyst in combination with $BF_3*Et_2O$ in the metathetic degradation of NBR Experiment 2.0

Use of the Grela catalyst without addition of boron compounds (not according to the invention)

| NBR Amount [g] | Grela catalyst | | 1-Hexene | | Additive | |
|---|---|---|---|---|---|---|
| | Amount [mg] | Based on NBR [phr] | Amount [g] | Based on NBR [phr] | Type | Amount [g] |
| 40 | 15.8 | 0.04 | 0.8 | 2.0 | — | — |

| Time [min.] | $M_w$ [kg/mol] | $M_n$ [kg/mol] | PDI |
|---|---|---|---|
| 0 | 211 | 82 | 2.6 |
| 30 | 49 | 34 | 1.4 |
| 60 | 48 | 31 | 1.6 |

Experiment 2.1

Use of the Grela catalyst in combination with $BF_3*Et_2O$ at a molar ratio of Grela catalyst/$BF_3*Et_2O$=1:22 (according to the invention)

| NBR Amount [g] | Grela catalyst | | 1-Hexene | | Additive | |
|---|---|---|---|---|---|---|
| | Amount [mg] | Based on NBR [phr] | Amount [g] | Based on NBR [phr] | Type | Amount [g] |
| 40 | 15.8 | 0.04 | 0.8 | 2.0 | $BF_3*Et_2O$ | 0.0074 |

| Time [min.] | $M_w$ [kg/mol] | $M_n$ [kg/mol] | PDI |
|---|---|---|---|
| 0 | 211 | 82 | 2.6 |
| 30 | 38 | 20 | 1.9 |
| 60 | 33 | 17 | 2.0 |
| 185 | 33 | 17 | 1.9 |
| 425 | 31 | 16 | 1.9 |

In series 2, it is shown that the metathetic degradation of nitrile rubber is accelerated when the Greta catalyst is used in combination with $BF_3*Et_2O$; i.e. after the same reaction times, $M_w$, and $M_n$ are significantly lower than in the reference experiment (experiment 2.0) which is carried out without an additive.

What is claimed is:

1. A process for reducing the molecular weight of nitrile rubber, comprising bringing into contact and reacting a nitrile rubber with a catalyst system, characterized in that the catalyst system comprises a metathesis complex catalyst and at least one compound of the general formula (Z):

$$BF_mX_n*D_v \qquad (Z)$$

where
$BF_mX_n$ is $BF_3$, $BF_2Cl$, $BFCl_2$, $BF_2Br$, $BFBr_2$, $BF_2(OC_2H_5)$, $BF(OC_2H_5)_2$, $BF_2(CH_3)$ or $BF(CH_3)_2$, D is water, diethyl ether, ethylamine, THF, n-propanol, formic acid, acetic acid, trifluoroacetic acid, trichloroacetic acid, sulphuric acid, phosphoric acid, trifluoromethanesulphonic acid or toluenesulphonic acid, and m is 1, 2, or 3, n is 0, 1, or 2, m+n=3, v is 1, 2, or 3, and wherein as the catalyst either compounds of the general formula (A),

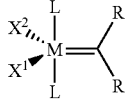
(A)

where

M is osmium or ruthenium, $X^1$ and $X^2$ are identical or different and are two ligands, L represents identical or different ligands, the radicals R are identical or different and are each hydrogen, an alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, where these radicals can all optionally be substituted by one or more alkyl, halogen, alkoxy, aryl- or heteroaryl radicals or alternatively the two radicals R are bridged with inclusion of the common C atom to which they are bound to form a cyclic group which can be aliphatic or aromatic in nature, are optionally be substituted and optionally contain one or more heteroatoms, or compounds of the general formula (B),

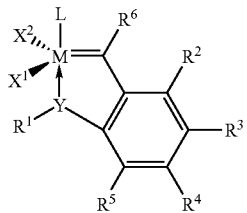
(B)

where

M is ruthenium or osmium,

Y is oxygen (O), sulphur (S), an N—$R^1$ radical or a P—$R^1$ radical, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand which has the same meaning as the ligand L in formula (A), or compounds of general formula (C),

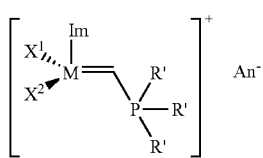
(C)

where

M is ruthenium or osmium, $X^1$ and $X^2$ are identical or different and are anionic ligands, the radicals R' are identical or different and are organic radicals, Im is a substituted or unsubstituted imidazolidine radical and An is an anion, or compounds of general formula (D),

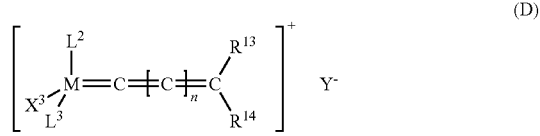
(D)

where

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged π-bonded ligand, either monocyclic or polycyclic, $L^3$ is a ligand selected from a group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines, $Y^-$ is a noncoordinating anion and n is 0, 1, 2, 3, 4 or 5, or compounds of general formula (E),

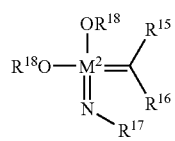
(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof, or compounds of general formula (F),

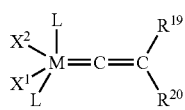
(F)

where
M is ruthenium or osmium,
$X^1$ and $X^2$ are identical or different and are anionic ligands
L represents identical or different ligands which have the same meaning as L in the general formulae (A) and (B) and
$R^{19}$ and $R^{20}$ are identical or different and are each hydrogen or substituted or unsubstituted alkyl,
or compounds of general formula (G), (H) or (K),

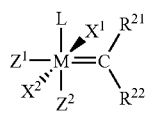
(G)

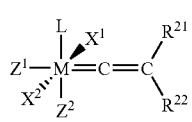
(H)

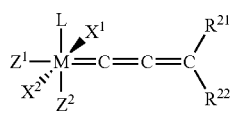
(K)

where
M is osmium or ruthenium,
$X^1$ and $X^2$ are identical or different and are two ligands,
L is a ligand, $Z^1$ and $Z^2$ are identical or different and are uncharged electron donors,
$R^{21}$ and $R^{22}$ are each, independently of one another, hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl, each of which may be substituted by one or more radicals selected from among alkyl, halogen, alkoxy, aryl and heteroaryl,
or a catalyst (N) which has the general structural element (N1),

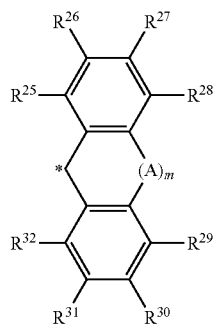
(N1)

where the carbon atom denoted by "*" is bound via one or more double bonds to the basic catalyst framework of a ruthenium- or osmium-carbene complex catalyst of the general formula (N10a) or (N10b):

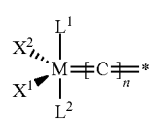
(N10a)

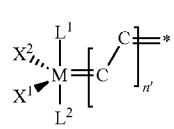
(N10b)

where
M is ruthenium or osmium,
$X^1$ and $X^2$ are identical or different and are two ligands,
$L^1$ and $L^2$ are identical or different ligands,
n is 0, 1, 2, or 3,
n' is 1 or 2,
and
$R^{25}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where these radicals can all optionally be substituted by one or more alkyl, halogen, alkoxy, aryl or heteroaryl radicals, or alternatively two directly adjacent radicals from the group consisting of $R^{25}$-$R^{32}$ can be bridged with inclusion of the ring carbons to which they are bound to form a cyclic group, optionally an aromatic system, or alternatively $R^{32}$ may be bridged to another ligand of the ruthenium- or osmium-carbene complex catalyst,
m is 0 or; and
A is oxygen, sulphur, $C(R^{33}R^{34})$, N—$R^{35}$, —$C(R^{36})$=C$(R^{37})$—, —$C(R^{36})(R^{38})$—$C(R^{37})(R^{39})$—, where $R^{33}$-$R^{39}$ are identical or different and each have the same meanings as the radicals $R^{25}$-$R^{32}$
are used.

2. The process according to claim 1, wherein L in general formula (B) is a $P(R^7)_3$ radical, where the radicals $R^7$ are each, independently of one another, $C_1$-$C_6$-alkyl, $C_3$-$C_8$-cycloalkyl or aryl or else L is a substituted or unsubstituted imidazolidine radical ("Im").

3. The process according to claim 2, wherein the imidazolidine radical ("Im") has one of the structures (IIIa) to (IIIf) below, where Ph is in each case is phenyl, Bu is butyl and Mes is a 2,4,6-trimethylphenyl radical or Mes alternatively in each case is a 2,6-diisopropylphenyl radical:

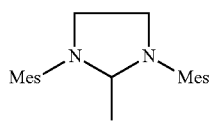
(IIIa)

-continued

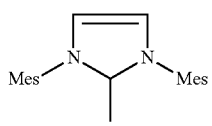 (IIIb)

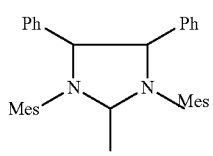 (IIIc)

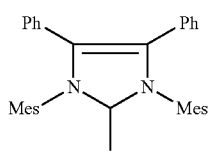 (IIId)

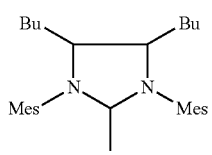 (IIIe)

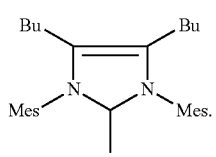 (IIIf)

4. The process according to claim 1, wherein $X^1$ and $X^2$ in the general formula (B):
  a. are identical or different and are each hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl; or
  b. are identical or different and are each fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate; or
  c. are identical and are each chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

5. The process according to claim 1, wherein a catalyst of formula (B) having the general formula (B1):

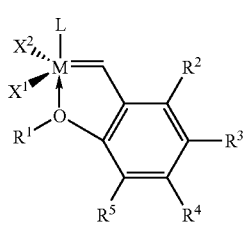 (B1)

where
M, L, $X^1$, $X^2$, $R^1$, $R^2$, $R^3$, $R^4$ and $R^5$ have the meanings given for the general formula (B), is used.

6. The process according to claim 5, wherein the catalyst of general formula (B1) in which
  M is ruthenium,
  $X^1$ and $X^2$ are both halogen, in particular chlorine,
  $R^1$ is a straight-chain or branched $C_1$-$C_{12}$ alkyl radical,
  $R^2$, $R^3$, $R^4$, $R^5$ have the meanings given for the general formula (B), and
  L have the meanings given for the general formula (B),
is used.

7. The process according to claim 5, wherein the catalyst of general formula (B1) in which
  M is ruthenium,
  $X^1$ and $X^2$ are both chlorine,
  $R^1$ is an isopropyl radical,
  $R^2$, $R^3$, $R^4$, $R^5$ are all hydrogen and
  L is a substituted or unsubstituted imidazolidine radical of the formula (IIa) or (IIb),

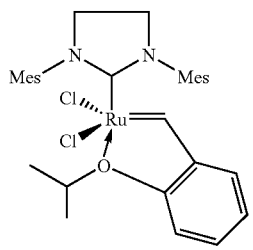 (VII)

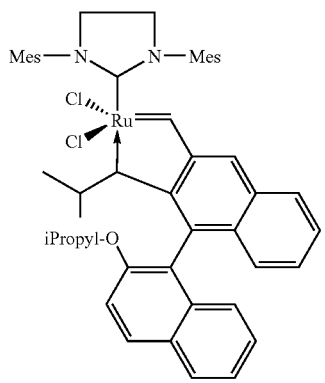 (VIII)

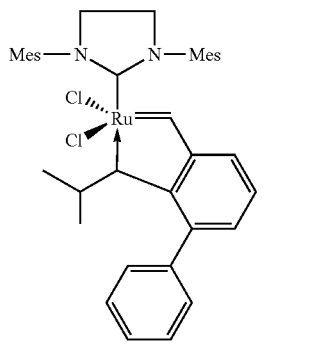 (IX)

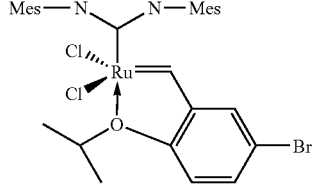 (X)

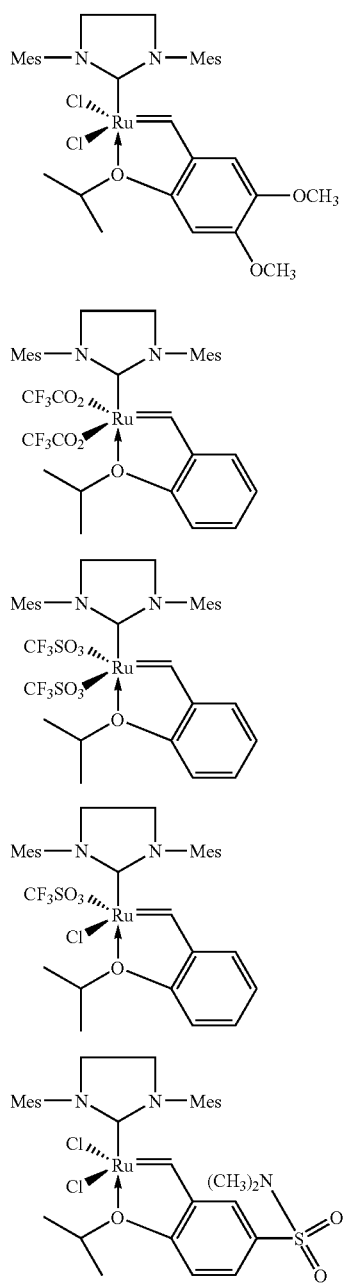

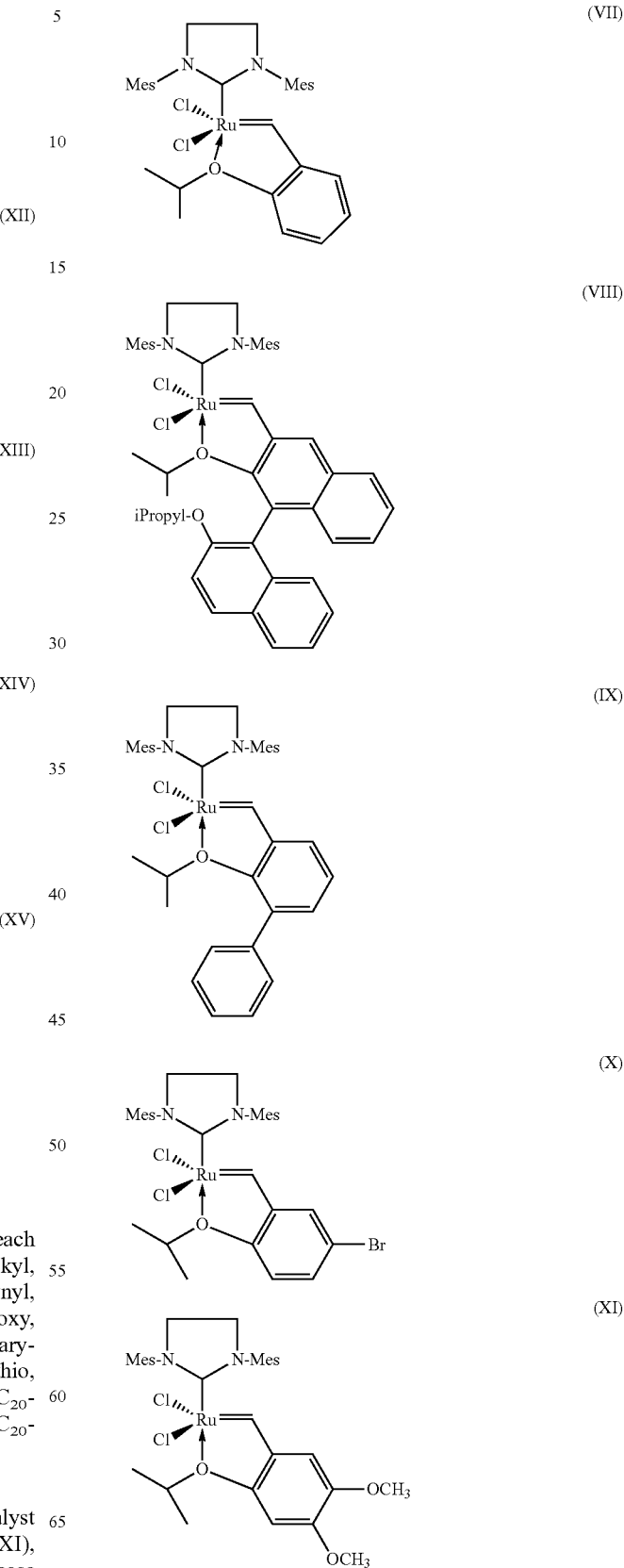

where

R[8], R[9], R[10], R[11] are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl, is used.

8. The process according to claim 5, wherein a catalyst having one of the structures (VII), (VIII), (IX), (X), (XI), (XII), (XIII), (XIV) and (XV), where Mes is in each case 2,4,6-trimethylphenyl, is used as catalyst of the general structural formula (B1)

-continued

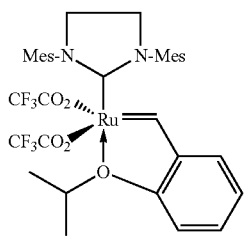

(XII)

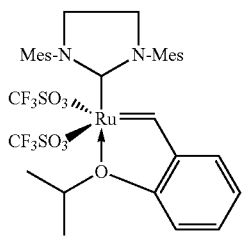

(XIII)

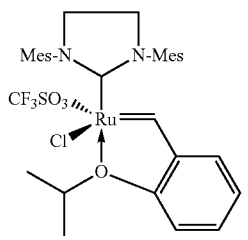

(XIV)

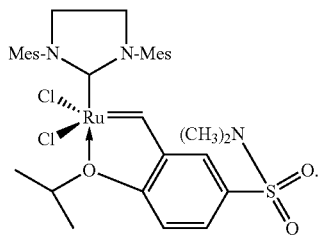

(XV)

9. The process according to claim 1, wherein catalyst (B) of the general formula (B2),

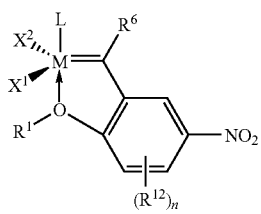

(B2)

where

M, L, $X^1$, $X^2$, $R^1$ and $R^6$ have the meanings given for the general formula (B) in claim 1, the radicals $R^{12}$ are identical or different and have the meanings given for the radicals $R^2$, $R^3$, $R^4$ and $R^5$ in the general formula (B) in claim 1, with the exception of hydrogen, and n is 0, 1, 2 or 3, is used.

10. The process according to claim 9, wherein the catalyst has one of the following structures (XVI) and (XVII), where Mes is in each case 2,4,6-trimethylphenyl:

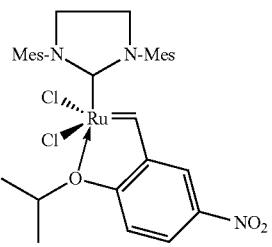

(XVI)

(XVII)

11. The process according to claim 1, wherein catalyst (B), which is part of a dendritic catalyst of the general formula (B3):

$$D^4 - \underset{\underset{D^3}{|}}{\overset{\overset{D^1}{|}}{Si}} - D^2$$

(B3)

where $D^1$, $D^2$, $D^3$ and $D^4$ in each case have a structure of the general formula (XVIII) shown below which is bound via the methylene group to the silicon of the formula (B3), (XVIII)

where

M, L, $X^1$, $X^2$, $R^1$, $R^2$, $R^3$, $R^5$ and $R^6$ have the meanings given for the general formula (B) in claim 1, is used.

12. The process according to claim 1, claim 1, wherein catalyst (B) of the general formula (B4), (B4)

where the symbol ● represents a support, is used.

13. The process according to claim 1, wherein the complex catalyst and the compound of the general formula (Z) are used in a molar ratio of [complex catalyst:compound of the general formula (Z)] of 1:(0.1-1000).

14. The process according to claim 13, wherein the complex catalyst and the compound of the general formula (Z) are used in a molar ratio of [complex catalyst:compound of the general formula (Z)] of 1:(0.5-100).

15. The process according to claim 14, wherein the complex catalyst and the compound of the general formula (Z) are used in a molar ratio of [complex catalyst:compound of the general formula (Z)] of 1:(1-50).

16. The process according to claim 1, wherein a copolymer or terpolymer which contains repeating units of at least one conjugated diene, and at least one α,β-unsaturated nitrile is used as nitrile rubber.

17. The process according to claim 1, wherein a copolymer or terpolymer which contains repeating units of at least one conjugated diene, at least one α,β-unsaturated nitrile and one or more further copolymerizable monomers is used as nitrile rubber.

18. The process according to claim 1, wherein the compound of the general formula (Z) is added in a solvent or dispersion medium or alternatively without solvent or dispersion medium to the complex catalyst or a solution of the complex catalyst.

19. The process according to claim 1, wherein the amount of the complex catalyst present in the catalyst system corresponds to from 1 to 1000 ppm of noble metal, based on the nitrile rubber used, when a complex catalyst comprising a noble metal is used—since molybedenum and tungsten in catalyst (E) are not noble metals.

20. The process according to claim 1, wherein the amount of the complex catalyst present in the catalyst system corresponds to from 2 to 500 ppm of noble metal, based on the nitrile rubber used, when a complex catalyst comprising a noble metal is used.

21. The process according to claim 1, wherein the amount of the complex catalyst present in the catalyst system corresponds to from 5 to 250 ppm of noble metal, based on the nitrile rubber used, when a complex catalyst comprising a noble metal is used—since molybedenum and tungsten in catalyst (E) are not noble metals.

22. The process according to claim 1, wherein the reaction is carried out in the presence of a co-olefin.

23. The process according to claim 1, wherein
$X^1$ and $X^2$ are identical or different and anionic ligands,
L represents uncharged electron donors,
the radicals R are identical or different and are each hydrogen, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, or $C_1$-$C_{20}$-alkylsulphinyl, where these radicals can all optionally be substituted by one or more alkyl, halogen, alkoxy, aryl- or heteroaryl radicals or alternatively the two radicals R are bridged with inclusion of the common C atom to which they are bound to form a cyclic group which can be aliphatic or aromatic in nature, which may optionally be substituted and can contain one or more heteroatoms.

24. The process according to claim 1, wherein $X^1$ and $X^2$ are identical or different and are each hydrogen, halogen, pseudohalogen, straight-chain or branched $C_1$-$C_{30}$-alkyl, $C_6$-$C_{24}$-aryl, $C_1$-$C_{20}$alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

25. The process according to claim 1, wherein $X^1$ and $X^2$ are identical or different and are each fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulphonate.

26. The process according to claim 1, wherein $X^1$ and $X^2$ are identical and are each chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$-$C_6H_4$-$SO_3$), mesylate (2,4,6-trimethylphenyl) or $CF_3SO_3$ (trifluoromethanesulphonate).

27. The process according to claim 1, wherein the two ligands L are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

28. The process according to claim 27, wherein the imidazolidine radical (Im) has a structure of the general formulae (IIa) or (IIb),

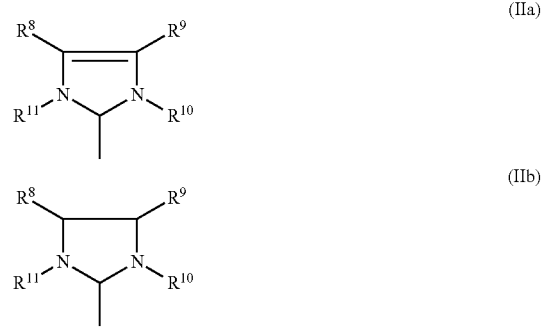

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl, where all the abovementioned radicals may optionally be substituted.

29. The process according to claim 1, wherein catalysts of the general formula (A1),

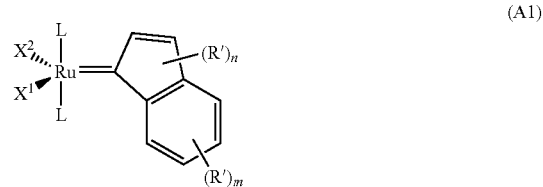

where
$X^1$ and $X^2$ are identical or different and are two ligands,
L represents identical or different ligands,
n is 0, 1 or 2,
m is 0, 1, 2, 3 or 4 and the radicals R' are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all be substituted by one or more alkyl, halogen, alkoxy, aryl or heteroaryl radicals, are used.

30. The process according to claim 1, wherein the catalyst has the structure (IV), (V) or (VI), where Cy is in each case cyclohexyl, Mes is 2,4,6-trimethylphenyl and Ph is phenyl.

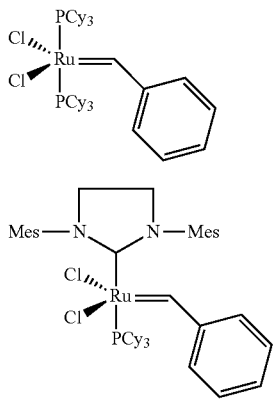

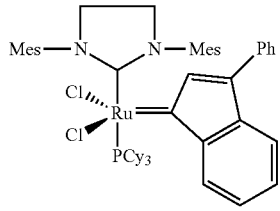

31. The process according to claim 1, wherein $X^1$ and $X^2$ of the general formula (A) are anionic ligands.

32. The process according to claim 1, wherein the radicals R of the general formula (A) are identical or different and are each hydrogen, $C_1$-$C_{30}$-alkyls, $C_3$-$C_{20}$-cycloalkyls, $C_2$-$C_{20}$-alkenyls, $C_2$-$C_{20}$-alkynyls, $C_6$-$C_{24}$-aryls, $C_1$-$C_{20}$-carboxylates, $C_1$-$C_{20}$-alkoxys, $C_2$-$C_{20}$-alkenyloxys, $C_2$-$C_{20}$-alkynyloxs, $C_6$-$C_{24}$-aryloxys, $C_2$-$C_{20}$-alkoxycarbonyls, $C_1$-$C_{30}$-alkylaminos, $C_1$-$C_{30}$-alkylthios, $C_6$-$C_{24}$-arylthios, $C_1$-$C_{20}$-alkylsulphonyls, or $C_1$-$C_{20}$-alkylsulphinyls, where these radicals can all optionally be substituted by one or more alkyl, halogen, selected from the group containing fluorine or chlorine, alkoxy, aryl- or heteroaryl radicals or alternatively the two radicals R are bridged with inclusion of the common C atom to which they are bound to form a cyclic group which can be aliphatic or aromatic in nature, which may optionally be substituted and can contain one or more heteroatoms.

\* \* \* \* \*